US012707319B2

(12) United States Patent
Srinivasan et al.

(10) Patent No.: US 12,707,319 B2
(45) Date of Patent: Aug. 11, 2026

(54) ProSe REMOTE AND RELAYING ENTITY QoS MANAGEMENT

(71) Applicant: KONINKIJKE PHILIP N.V., Eindhoven (NL)

(72) Inventors: Nithin Srinivasan, Berlin (DE); Roya Ebrahim Rezagah, Berlin (DE); Jasmina McMenamy, Berlin (DE); Baris Göktepe, Berlin (DE); Thomas Wirth, Berlin (DE); Cornelius Hellge, Berlin (DE); Thomas Schierl, Berlin (DE); Sarun Selvanesan, Berlin (DE); Thomas Fehrenbach, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 599 days.

(21) Appl. No.: 18/066,221

(22) Filed: Dec. 14, 2022

(65) Prior Publication Data

US 2023/0127924 A1 Apr. 27, 2023

Related U.S. Application Data

(63) Continuation of application No. PCT/EP2021/065971, filed on Jun. 14, 2021.

(30) Foreign Application Priority Data

Jun. 19, 2020 (EP) .................................... 20181208

(51) Int. Cl.

*H04W 28/02* (2009.01)
*H04W 76/14* (2018.01)
*H04W 88/04* (2009.01)

(52) U.S. Cl.

CPC ....... *H04W 28/0268* (2013.01); *H04W 76/14* (2018.02); *H04W 88/04* (2013.01)

(58) Field of Classification Search

CPC .. H04W 28/0268; H04W 76/14; H04W 88/04
See application file for complete search history.

(56) References Cited

U.S. PATENT DOCUMENTS 10,278,158 B2 4/2019 Rudolf et al.
10,805,858 B2 10/2020 Loehr et al.
(Continued)

FOREIGN PATENT DOCUMENTS

WO 2019160489 A1 8/2019
WO 2020060333 A1 3/2020

OTHER PUBLICATIONS

3GPP TR 22.866 V17.1.0, enhanced Relays for Energy Efficiency and Extensive Coverage, (Dec. 20, 2019).
(Continued)

*Primary Examiner* — Won Tae C Kim

(57) ABSTRACT

A user device, UE, for a wireless communication network, acts as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS. The UE is connected via a sidelink to one or more of the following: one or more of the remote UEs, the destination, one or more further relay UEs. The UE determines a status of the sidelink with regard to the predefined or negotiated QoS, and sends the status of the sidelink towards a network entity, like a base station, of the wireless communication network.

24 Claims, 23 Drawing Sheets

(56) References Cited

U.S. PATENT DOCUMENTS

| | | | | |
|---|---|---|---|---|
| 2017/0353819 | A1 | 12/2017 | Son et al. | |
| 2019/0053215 | A1 | 2/2019 | Yu et al. | |
| 2019/0229853 | A1 | 7/2019 | Lee et al. | |
| 2019/0230572 | A1 | 7/2019 | Cheng et al. | |
| 2021/0352700 | A1 * | 11/2021 | Lohr | H04W 72/21 |
| 2022/0159768 | A1 * | 5/2022 | Zhu | H04L 1/1874 |
| 2022/0287115 | A1 * | 9/2022 | Hu | H04W 28/0268 |

OTHER PUBLICATIONS

3GPP TS 23.501 V16.4.0+, System architecture for the 5G System(5GS), (May 25, 2020).
3GPP TS 23.501 V15.4.0+, System architecture for the 5G System(5GS), (Jun. 12, 2017).
Samsung "KI#3 New Sol: Qos Handling for Remote UE" Jun. 12, 2020.
International Search Report and Written Opinion from PCT/EP2021/065971 dated Dec. 29, 2022.
3GPP TSG-RAN WG2 Meeting #1093 "Consideration on uplink low-latency scheduling" Feb. 24-Mar. 6, 2020.

* cited by examiner initialization during the session messages which are used for the communication shown in (b)

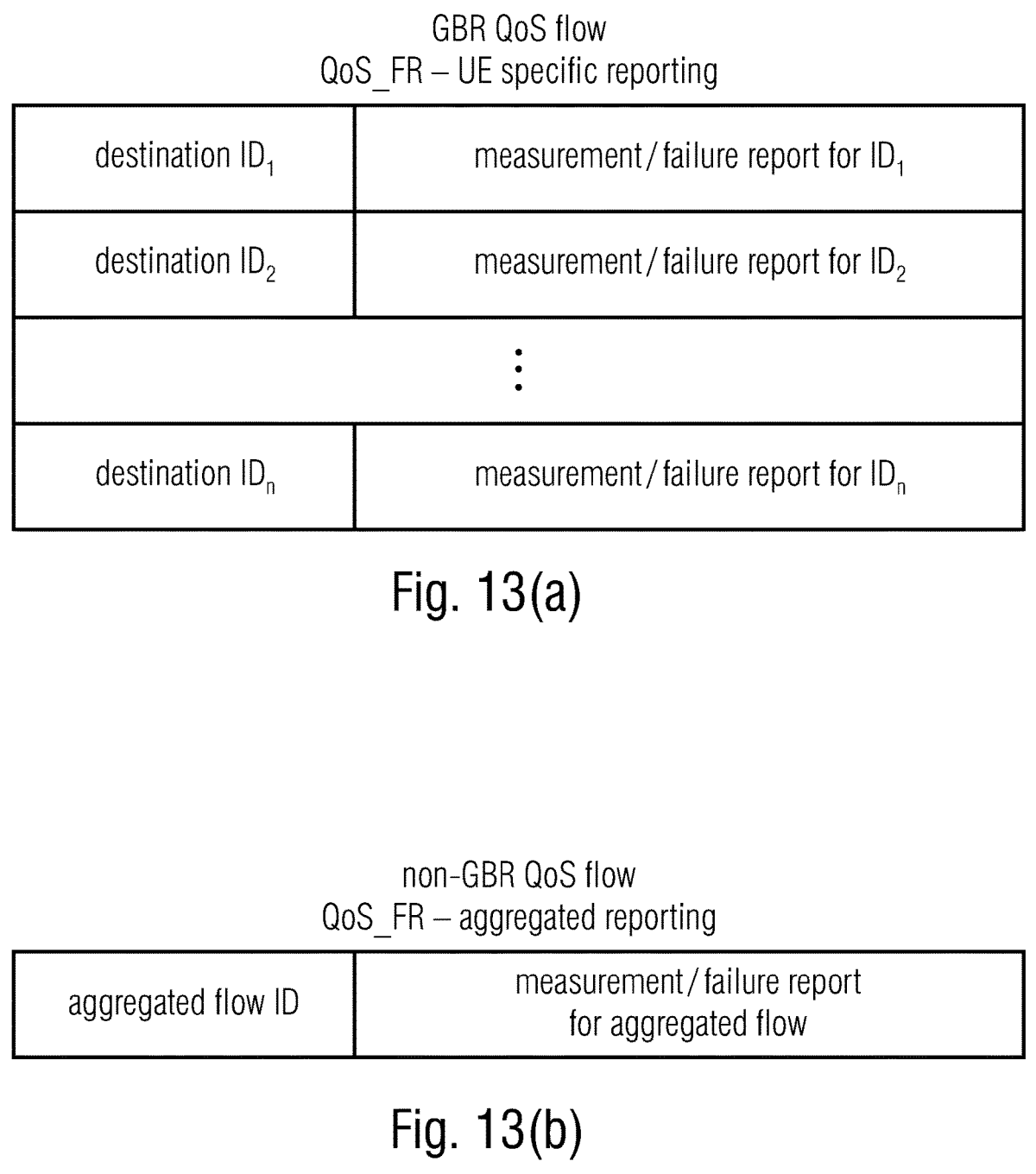

GBR QoS flow
QoS_FR – UE specific reporting

| | |
|---|---|
| destination $ID_1$ | measurement/failure report for $ID_1$ |
| destination $ID_2$ | measurement/failure report for $ID_2$ |
| ⋮ | |
| destination $ID_n$ | measurement/failure report for $ID_n$ |

Fig. 13(a)

non-GBR QoS flow
QoS_FR – aggregated reporting

| | |
|---|---|
| aggregated flow ID | measurement/failure report for aggregated flow |

Fig. 13(b)

non-GBR and GBR QoS flow
QoS_FR – UE specific and aggregated reporting

| | |
|---|---|
| destination $ID_1$ | measurement/failure report for $ID_1$ |
| destination $ID_2$ | measurement/failure report for $ID_2$ |
| ⋮ | |
| destination $ID_n$ | measurement/failure report for $ID_n$ |
| aggregated flow ID | measurement/failure report for aggregated flow |

Fig. 13(c)

ProSe REMOTE AND RELAYING ENTITY QoS MANAGEMENT

CROSS-REFERENCES TO RELATED APPLICATIONS

This application is a continuation of copending International Application No. PCT/EP2021/065971, filed Jun. 14, 2021, which is incorporated herein by reference in its entirety, and additionally claims priority from European Application No. EP 20 181 208.8, filed Jun. 19, 2020, which is incorporated herein by reference in its entirety.

BACKGROUND OF THE INVENTION

The present invention relates to the field of wireless communication systems or networks, more specifically to the field of relay devices, like sidelink relay devices, used to provide functionality to support connectivity between a transmitting entity and a receiving entity. Embodiments of the present invention concern proximity based services, ProSe, remote and relaying entity QoS management.

FIG. 1 is a schematic representation of an example of a terrestrial wireless network 100 including, as is shown in FIG. 1(*a*), the core network 102 and one or more radio access networks $RAN_1$, $RAN_2$, . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. The external network can be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $\mathbf{116}_1$ to $\mathbf{116}_5$, which are schematically represented in FIG. 1(*b*) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, the physical downlink, uplink and sidelink control channels, PDCCH, PUCCH, PSSCH, carrying for example the downlink control information, DCI, the uplink control information, UCI, and the sidelink control information, SCI. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs can have functionalities of BS or of UEs, depending on the specific network configuration. Other UEs may not be vehicular related UEs and may comprise any of the above-mentioned devices. Such devices may also communicate directly with each other, D2D communication, using the SL channels.

It is noted that the information in the above section is only for enhancing the understanding of the background of the invention and, therefore, it may contain information that does not form conventional technology that is already known to a person of ordinary skill in the art.

Starting from the above, there may be a need for improvements or enhancements of relaying transmissions in a wireless communication system or network.

SUMMARY

An embodiment may have a user device, UE, for a wireless communication network, wherein the UE is to act as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, wherein the UE is connected via a sidelink to one or more of the following:

one or more of the remote UEs, the destination, one or more further relay UEs, wherein the UE is to determine a status of the sidelink with regard to the predefined or negotiated QoS, and wherein the UE is to send the status of the sidelink towards a network entity, like a base station, of the wireless communication network.

Another embodiment may have a user device, UE, for a wireless communication network, wherein the UE is to act as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the UE is connected via a sidelink to one or more of the following:

one or more of the remote UEs, the destination, one or more further relay UEs, and wherein, responsive to receiving from the destination or from the remote UE or from another relaying entity a first transmission, like a packet, associated with the Reflective Quality-of-Service, QoS, Indicator, RQI, and/or Relay QoS Packet Processing Information, RPPQI, the UE is to process a second transmission to the destination, to the remote UE or to the other relay in accordance with the QoS associated with the first transmission.

Another embodiment may have a user device, UE, for a wireless communication network, herein the UE is to act as a relaying entity so as to provide functionality to support connectivity between the one or more remote UEs and a destination of the wireless communication network, wherein a connection between the remote UE and the destination via the UE is associated with a predefined or negotiated Quality-of-Service, QoS, and wherein the UE is connected via a sidelink to one or more of the following:

one or more of the remote UEs, the destination, one or more further relay UEs, and wherein, responsive to one or more criteria, the UE is to trigger an early Buffer Status Report, BSR.

Another embodiment may have a network entity, like a base station, for a wireless communication network, wherein the network entity is to communicate with one or more relaying entities, the relaying entity providing functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the relay UE is connected via a sidelink to one or more of the following:

one or more of the remote UEs, the destination, one or more further relay UEs, and wherein the network entity is to receive from the relaying entity a status of the sidelink with regard to the predefined or negotiated QoS.

Another embodiment may have an apparatus for a wireless communication network, the wireless communication network comprising one or more relaying entities providing functionality to support connectivity between the one or more remote UEs and a destination, wherein a connection between the remote UE and the destination comprises one or more sidelinks, each sidelink associated with a predefined or negotiated Quality-of-Service, QoS, wherein the relay UE is connected via a sidelink to one or more of the following:

one or more of the remote UEs, the destination, one or more further relay UEs, and wherein, using measurements of QoS parameters associated with the predefined or negotiated QoS on one or more or all of the links between the remote UE and the destination, the apparatus is to determine or calculate and/or to signal to the relaying entity, e.g., as QoS assistance information, QoS_AI, a tolerance for the QoS parameters associated with a predefined or negotiated QoS parameter on the sidelink, and wherein the apparatus is located at the remote UE, at a relaying entity, at the destination or at a network entity of the wireless communication network.

Another embodiment may have a wireless communication network, comprising one or more remote user devices, remote UE, according to the invention, and one or more user devices, relaying entity, according to the invention, providing functionality to support connectivity between the one or more remote UEs and a destination.

Another embodiment may have a method for operating a user device, UE, for a wireless communication network, wherein the UE acts as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the UE is connected via a sidelink to one or more of the following:

one or more of the remote UEs, the destination, one or more further relay UEs, the method comprising: determining a status of the sidelink with regard to the predefined or negotiated QoS, and sending the status of the sidelink towards a network entity, like a base station, of the wireless communication network.

Another embodiment may have a method for operating a user device, UE, for a wireless communication network, wherein the UE acts as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the UE is connected via a sidelink to one or more of the following:

one or more of the remote UEs, the destination, one or more further relay UEs, and the method comprising: responsive to receiving from the destination or from the remote UE or from another relaying entity a first transmission, like a packet, associated with the Reflective Quality-of-Service, QoS, Indicator, RQI, and/or Relay QoS Packet Processing Information, RPPQI, processing a second transmission to the destination, to the remote UE or to the other relay in accordance with the QoS associated with the first transmission.

Another embodiment may have a method for operating a user device, UE, for a wireless communication network, wherein the UE acts as a relaying entity so as to provide functionality to support connectivity between the one or more remote UEs and a destination of the wireless communication network, wherein a connection between the remote UE and the destination via the UE is associated with a predefined or negotiated Quality-of-Service, QoS, and wherein the UE is connected via a sidelink to one or more of the following:

one or more of the remote UEs, the destination, one or more further relay UEs, and the method comprising: responsive to one or more criteria, triggering an early Buffer Status Report, BSR.

Another embodiment may have a method for operating a network entity, like a base station, for a wireless communication network, wherein the network entity is to communicate with one or more relaying entities, the relaying entity providing functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the relay UE is connected via a sidelink to one or more of the following: one or more of the remote UEs, the destination, one or more further relay UEs, and the method comprising: receiving from the relaying entity a status of the sidelink with regard to the predefined or negotiated QoS.

Another embodiment may have a method for operating an apparatus for a wireless communication network, the wireless communication network comprising one or more relaying entities providing functionality to support connectivity between the one or more remote UEs and a destination, wherein a connection between the remote UE and the destination comprises one or more sidelinks, each sidelink associated with a predefined or negotiated Quality-of-Service, QoS, wherein the apparatus is located at the remote UE, at a relaying entity, at the destination or at a network entity of the wireless communication network, and wherein the relay UE is connected via a sidelink to one or more of the following:

one or more of the remote UEs, the destination, one or more further relay UEs, and the method comprising: using measurements of QoS parameters associated with the predefined or negotiated QoS on one or more or all of the links between the remote UE and the destination, determining or calculating and/or to signaling to the relaying entity, e.g., as QoS assistance information, QoS_AI, a tolerance for the QoS parameters associated with a predefined or negotiated QoS parameter on the sidelink.

Another embodiment may have a non-transitory digital storage medium having a computer program stored thereon to perform the methods according to the invention, when said computer program is run by a computer.

BRIEF DESCRIPTION OF THE DRAWINGS

Embodiments of the present invention will be detailed subsequently referring to the appended drawings, in which:

FIG. 13*a-c* illustrates embodiments of MAC control elements including the measurement or failure report for a plurality of destination IDs, as illustrated in FIG. 13(*a*), or including an aggregated measurement and/or failure report as illustrated in FIG. 13(*b*), or a combination thereof, as illustrated in FIG. 13(*c*);

DETAILED DESCRIPTION OF THE INVENTION

Embodiments of the present invention are now described in more detail with reference to the accompanying drawings, in which the same or similar elements have the same reference signs assigned.

In a wireless communication system or network, like the one described above with reference to FIG. 1, relay devices or relay nodes may be employed to solve performance issues, like a reduced data rate, a weaker signal and higher interference as it may be encountered on the radio coverage edges of a cell of a base station. The relay node may simply repeat and forward a received signal or transmission. In other examples, the relay node may extract data from a received signal or transmission, apply noise correction and send a new signal or a new transmission on its own. Rather than only repeating the signal, the relay node may also increases the signal quality.

Figure 1A:
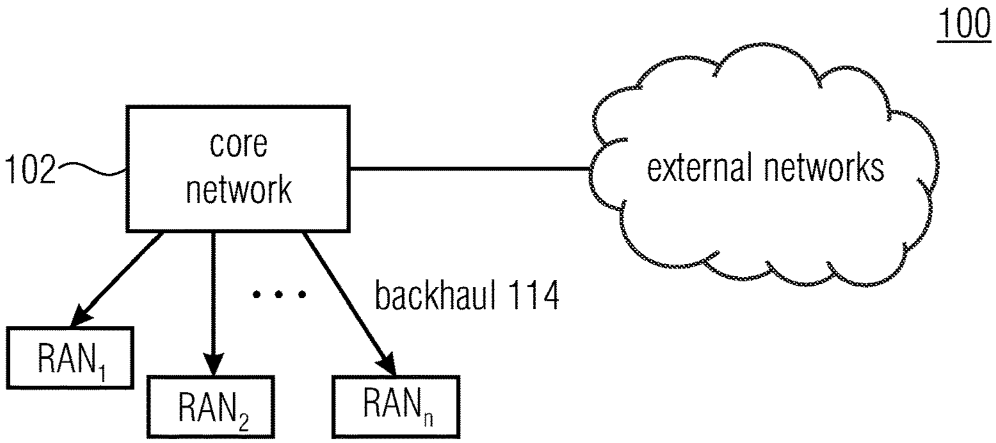
FIG. 1*a-b* is a schematic representation of an example of a terrestrial wireless network.
Figure 1B:
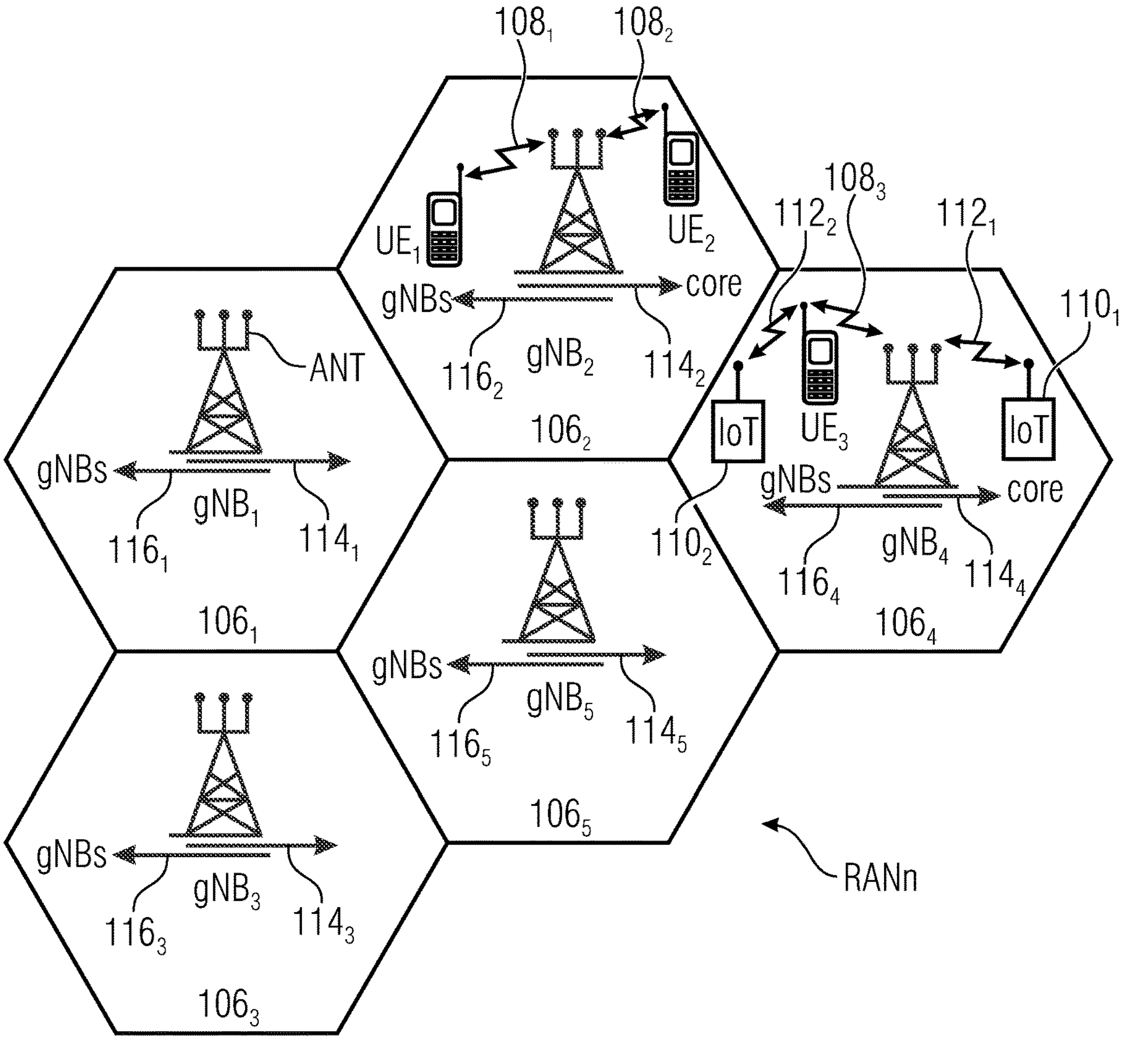

For example, when considering the relaying function of proximity based services, ProSe, as defined in the 3GPP, a user device, UE, also referred to as a remote user device, UE, being out of coverage, OOC, i.e., outside the coverage of any access network, like the RAN in FIG. 1, may enlist the services of another UE, the so-called relaying entity, also referred to as relay UE or relay node, which is in-coverage of the access network so as to obtain the services of the access network to which the relay UE is connected. The connection between the remote UE and the relay UE may be over a sidelink connection, using, for example, PC5 sidelink resources. The remote UE is not necessarily out of coverage, but may also enlist the services of the relay UE also when being in coverage, for example, for avoiding performance degradations as they may be encountered on radio coverage edges of a cell of an access point of the access network, like the base station. Also, the remote UE may connect to the access network via two or more relay UEs, what is also referred to as a multi-hop scenario in which more than one relay UE from a chain to connect the remote UE to its destination, which may be another user device or a network entity, for example, a RAN entity, like a base station or a gNB. In a multi-hop scenario, connecting the remote UE to the access network only the relay UE which immediately connects to the access network actually needs to be in coverage of an access point of the access network.

Figure 2A:
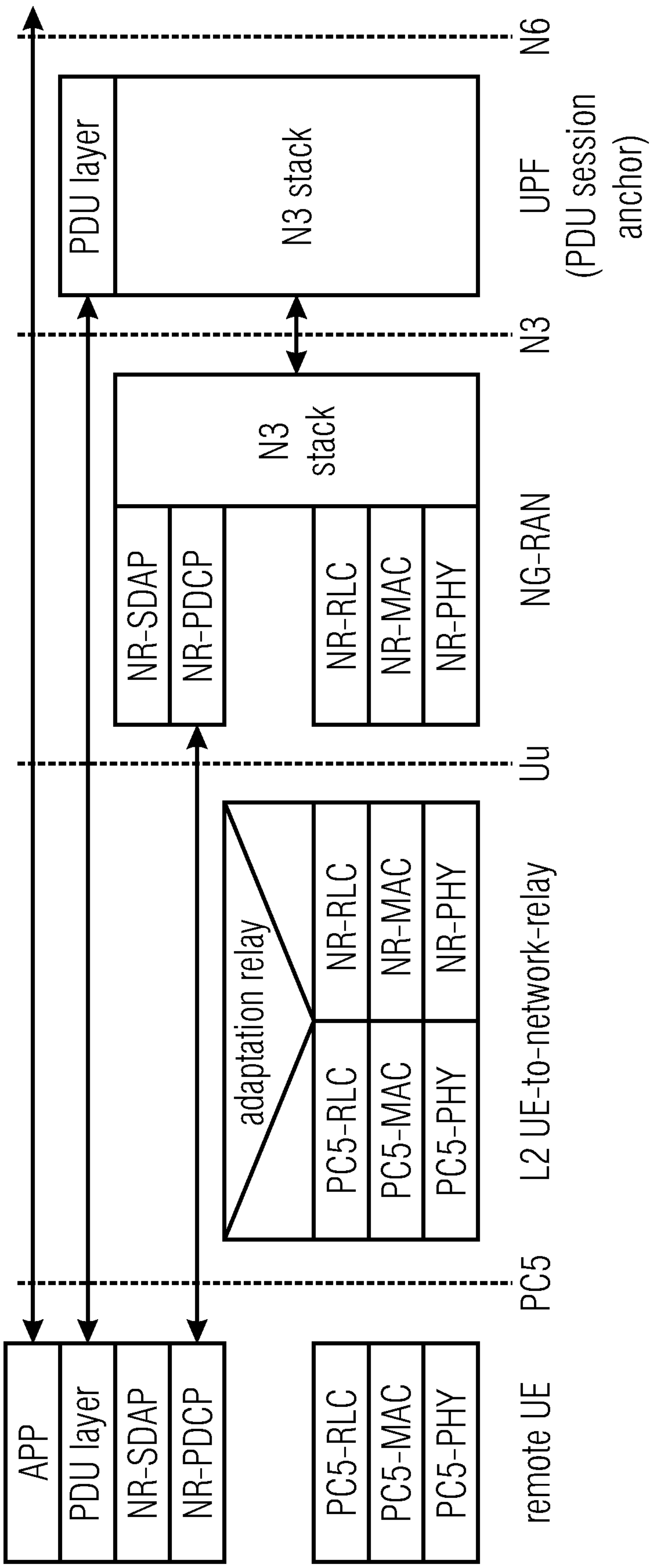
FIG. 2*a-b* illustrates protocol stacks for certain UE-to-network relaying scenarios, wherein FIG. 2(*a*) illustrates the protocol stock for L2 relaying, and FIG. 2(*b*) illustrates the protocol stack for L3 relaying.
Figure 2B:
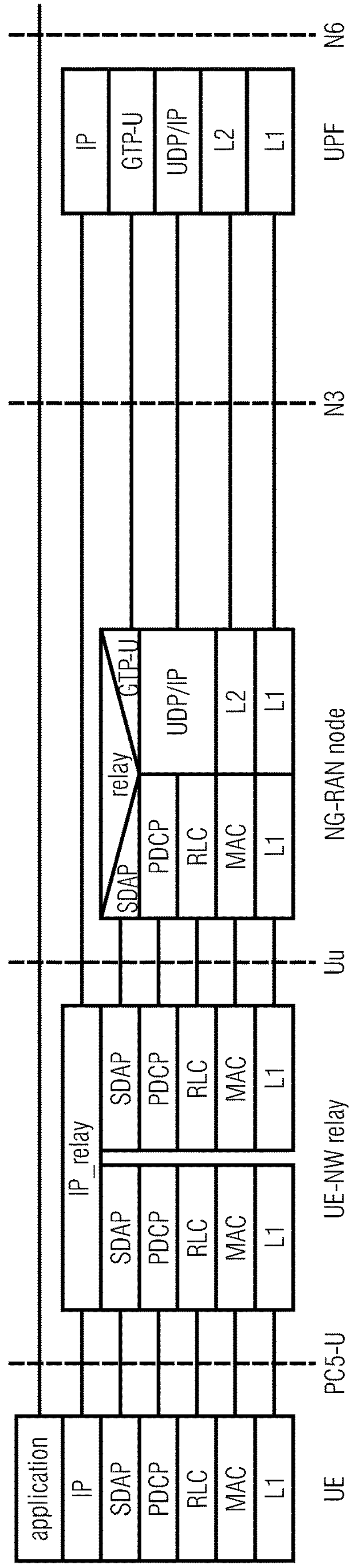

3GPP provides two solutions for the relaying function, namely the so-called layer-2, L2, relaying and the layer-3, L3, relaying. FIG. 2 illustrates the respective protocol stacks, wherein FIG. 2(*a*) illustrates the protocol stock for L2 relaying, and FIG. 2(*b*) illustrates the protocol stack for L3 relaying. In FIG. 2, UE-to-network scenarios are illustrated, in which the destination is a network entity. As is illustrated, the remote UE is connected via the PC5 interface to the L2 or L3 relay which, in turn, is connected to the network, for example, to the radio access network via the Uu interface. The radio access network in turn is connected to the core network via the N3 network. In L2 relaying, see FIG. 2(*a*), the higher layers of the remote UE terminate at the radio access network, RAN, and at the core network, CN, thereby providing a structure for an end-to-end management of the system. In L3 relaying, see FIG. 2(*b*), all layers of the remote UE terminate at each hop at the relay UE, thereby providing a structure for a hop-by-hop management of the system.

In either of the scenarios described above with reference to FIG. 2, the quality of service, QoS, for the remote UE needs to be managed or maintained either in a single hop relaying scenario or in a multi-hop relaying scenario. Besides the aspect of QoS negotiation, which is performed during connection set up, also QoS management and/or maintenance, QoS-MM, is an issue that is performed while the connection is active. The present application deals with aspects of QoS-MM in a single hop-relaying scenario or in a multi-hop relaying scenario. In a non-relaying scenario, in case QoS parameters are not met at a certain time within the network entity and/or the UE, the QoS-MM procedure may involve QoS re-negotiations and may trigger a relay reselection or a change to another access network. For example, QoS-MM may involve a QoS notification control, QNC, mechanism for a guaranteed bitrate, GBR, flow that is specified, for example, in 3GPP TS 23.501 or 3GPP TS 23.502.

Figures 3A, 3B, 3C:
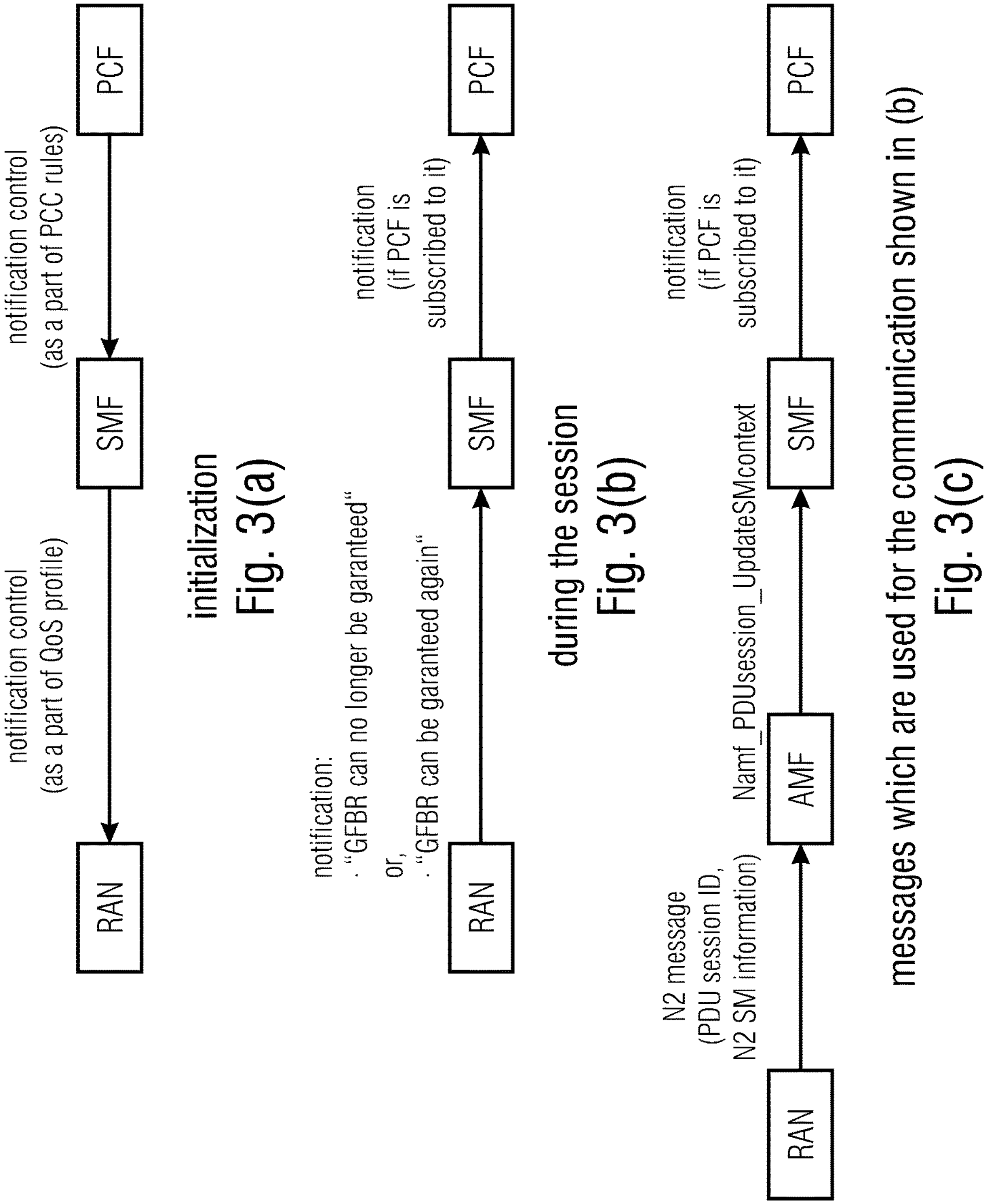
FIG. 3*a-c* illustrates a conventional QNC mechanism implemented between a radio access network and a core network of a wireless communication system or network, wherein FIG. 3(*a*) illustrates the initialization of the QNC mechanism, FIG. 3(*b*) illustrates the operation of the QNC mechanism during a session, and FIG. 3(*c*) illustrates the messages for a communication during the session in FIG. 3(*b*)

FIG. 3 illustrates a conventional QNC mechanism implemented between the radio access network and the core network of a wireless communication system or network. FIG. 3(*a*) illustrates the initialization of the QNC mechanism, FIG. 3(*b*) illustrates the operation of the QNC mechanism during a session, and FIG. 3(*c*) illustrates the messages for a communication during the session in FIG. 3(*b*). As is illustrated in FIG. 3(*a*), the QNC mechanism is implemented between the radio access network, RAN, and the core network. During session establishment the session management function, SMF, interacts with the Policy Control Function, PCF, for defining a QoS to be fulfilled for a communication between the remote UE and the destination, for example as part of the policy and charging control, PCC, rules. Based on these rules, the SMF determines a QoS profile defining the QoS requirements to be fulfilled for the session. The QoS profile is signaled to the RAN, and the notification control may be signaled to the RAN as part of the QoS profile.

Once initialized, as illustrated in FIG. 3(*b*), during the session, the QNC mechanism is active, and the RAN may monitor the guaranteed flow bit rate, GFBR, as one parameter provided by the QoS profile and send a notification to the SMF in case the GFBR is no longer guaranteed or is guaranteed again by the RAN. The SMF may forward the notification to the PCF, in case the PCF is subscribed to the notification.

As illustrated in FIG. 3(*c*), the signaling from the RAN to the SMF may be via the access and mobility function, AMF, using messages of the N2 interface including the PDU session ID and N2 session management, SM, information. The AMF communicates the information to the SMF, which, in turn, forwards a notification to the PCF if the PCF is subscribed to it. The QNC for each QoS flow in a PDU session may be kept in the SM context in the SMF. The QNC indicates whether notifications are requested from the RAN when the GFBR is no longer guaranteed or is guaranteed again for a QoS flow during the lifetime of the QoS flow. If notification control is configured for a GBR QoS flow, the access node, like the RAN, sends the N2 message to the SMF, in case the access node determines that QoS targets of the QoS flow are not fulfilled anymore or are fulfilled again. The UE is connected directly to the network via the Uu interface, and the SMF, based on the UE negotiated QoS requirements, like a GBR or a non-GBR, may provide the RAN with a combination of the following parameters:

- Guaranteed Flow Bit Rate, GFBR,
- Maximum Flow Bit Rate, MFBR,
- Maximum packet loss,
- Packet Delay Budget, PDP,
- Packet Error Rate, PER,
- Aggregated Maximum Bit Rate, AMBR, per UE and/or session.

With the notification enabled, i.e., in case the application server subscribes to the notification control, the RAN measures the different parameters for the QoS-MM and triggers a notification when necessary. The calculation of these parameters, is only dependent on the Uu interface between the UE and the RAN.

Another conventional concept of the QoS-MM is the so-called reflective QoS, R-QoS, which is signaled by the core network to the RAN and which indicates that some traffic carried on the QoS non-GBR flow is subject to reflective QoS. The RAN uses the reflective mapping to assist the UE on the uplink to perform QoS mapping between the QoS non-GBR flow and a data radio bearer. In case reflective QoS is configured for a given QoS flow and is activated for a certain packet, the reflective QoS avails of the information transmitted as a part of the session information on the downlink within a particular bearer, thereby reducing the signaling overhead. The UE may use the same QoS mapping on the uplink without the need for receiving additional control information, thereby avoiding the signaling as it is required when using an explicit signaling providing the UE with specific QoS flow to data bearer mapping rules to be used.

Figure 4A:
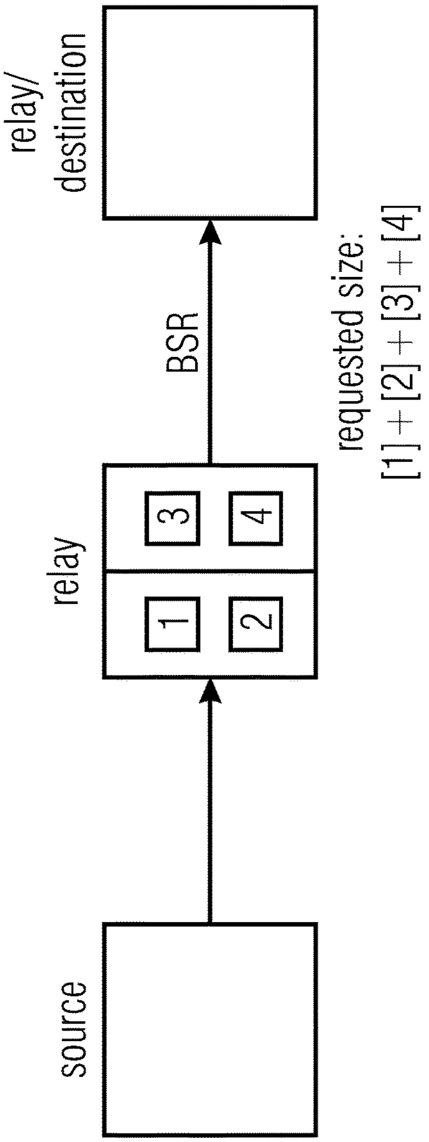
FIG. 4*a-b* illustrates a normal or regular BSR send by a relay, as shown in FIG. 4(*a*), versus an early BSR concept as illustrated in FIG. 4(*b*)
Figure 4B:
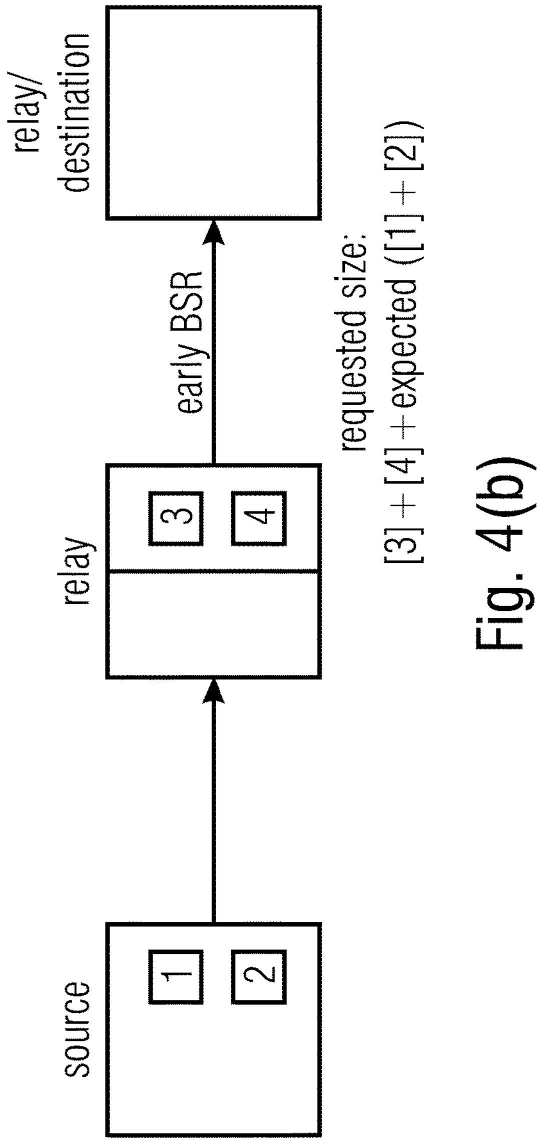

Yet another conventional concept of the QoS-MM is the so-called early buffer status report, early BSR. FIG. 4 illustrates a normal BSR, as shown in FIG. 4(*a*), versus the concept of an early BSR as illustrated in FIG. 4(*b*). In a normal BSR, a source, like a remote UE, may transmit packets 1 to 4 to the relay which, once the transmissions 1 to 4 are received at the relay, sends a BSR to the destination to request resources for sending the transmissions 1 to 4. When implementing the concept of an early buffer status report, the relay is aware that in addition to the already received transmissions 3 and 4, additional transmissions 1 and 2 are about to be transmitted by the source and, based on this knowledge, the relay triggers an early BSR requesting not only resources for sending transmissions 3 and 4, but also for sending the expected transmissions 1 and 2. Conventionally, in a context of an integrated access backhaul, IAB, the early BSR reporting is standardized to reduce the latency when requesting for resources for the relay node from the next hop or from the destination, like a base station, and the early BSR is triggered even before the data has arrived at the relay node from the source and is based on an expected amount of data the relay assumes to be receiving from the source.

Figure 5A:
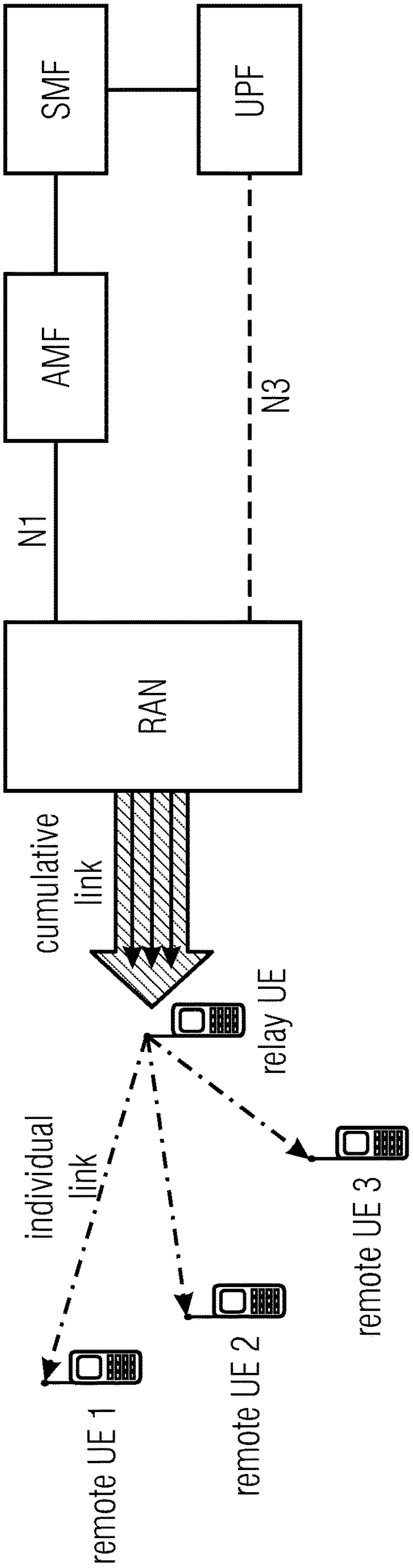
FIG. 5*a-b* illustrates transmission scenarios for a downlink, DL, transmission to one or more remote UEs, FIG. 5(*a*), or for an uplink, UL, transmission to the network, FIG. 5(*b*)
Figure 5B:
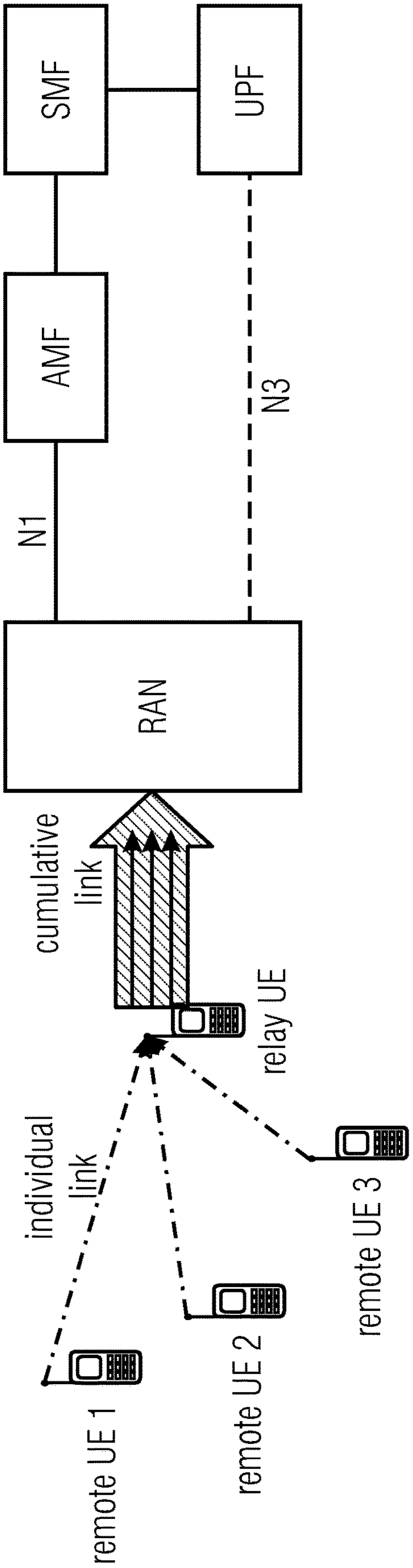

However, the above-described conventional approaches address the QoS issues only on the basis of the transmission over the Uu interface. When considering relaying scenarios in which a relay UE is connected to the access network and provides the relaying functionality for one or more remote UEs, there is no solution for a remote UE specific QoS handling or QoS-MM. The link between the access network and the relay UE is a single link used for the connection between the respective remote UEs and the destination, also referred to as a cumulative link. FIG. 5 illustrates transmission scenarios for a downlink, DL, transmission to one or more remote UEs, as illustrated in FIG. 5(*a*), or for an uplink, UL, transmission to the network as illustrated in FIG. 5(*b*). FIG. 5 illustrates the access network, RAN, that is connected via the N1 and N3 interfaces to the core network including the AMF, the SMF and the user plane function, UPF. A relay UE is connected to the RAN via the Uu interface and provides, in the depicted scenarios, connectivity for three remote UEs to the network, wherein each remote UE is connected to the relay UE via an individual link or sidelink, like a PC5 link. Each of the remote UEs has implemented one or more sessions with the core network being associated with respective QoS flows which may be different. Thus, when transmitting from the network to the respective remote UEs, as illustrated in FIG. 5(*a*), the link between the network and the relay UE is a cumulative link, and likewise, when transmitting from the remote UEs towards the network, again, the connection from the relay UE to the network is a cumulative link, i.e., the link lacks any UE-level granularity so that providing QoS-MM at a UE-level granularity for the connection between the remote UE and the network via the relay UE is not straightforward.

Reference [1], SA WG2 Meeting #139E, S2-2003786, Elbonia, 01-12 Jun. 2020, "KI #3, New Sol: QoS handling for Remote UE", describes sending a remote UE report message to the SMF for directly informing the SMF about a degradation on a PC5 sidelink, and sending a QNC notification from the RAN for informing the SMF about the degradation on a Uu interface between the relay and the core network. However, this approach requires a new communication directly between the relay and the core network, CN.

Reference [2], SA WG2 Meeting #139E (e-meeting), S2-2004289, Elbonia, Jun. 1-12, 2020, "KI #3, New solution to support end-to-end QoS for Layer-3 UE-to-Network Relay" describes an end-to-end connection from a remote UE to the core network involving two over-the-air links, i.e., Uu and PC5. To meet the Packet Delay Budget, PDB, for a particular service, the PDB utilized by the NG-RAN is reduced, in order to give some budget for the PC5 link. In other words, when considering a PC5 link and a Uu link, for achieving an overall PDB, the PDB for the Uu link is reduced in favor of the PDB for the PC5 link. Thus, respective QoS profiles for the two links are defined such that the needs for the PC5 link are considered when establishing the QoS profile for the Uu link.

The present invention addresses the above issues. Embodiments of the present invention implement QoS-MM mechanisms so as to allow for the QoS-MM also in single-hop relaying scenarios or in multi-hop relaying scenarios.

First Aspect

A first aspect of the present invention supports a QoS-MM mechanism for single-hop relaying scenarios or multi-hop relaying scenarios avoiding, other than reference [1], the need to implement a new direct communication between the relaying entity and the CN. Rather, in accordance with embodiments, a QoS status, like a remote UE report, is send from the relay to the RAN for triggering at the RAN the QNC notification that indicates that the QoS over the sidelink is not fulfilled. Also, information about the Uu interface condition, if needed, may be send using the QNC notification.

Second Aspect

A second aspect of the present invention further improves the concept of reference [2]. Rather than sticking to the respective QoS profiles for the links, tolerances for the QoS parameters are introduced that may be signaled as additional information, also referred to as QoS assistance information, QoS_AI. Once the QoS profiles for the links exist, measurements are performed on the links so as to determine or calculate the value for the QoS parameters that are actually achievable. On a certain link, the values for one or more parameters may be above the values actually needed for the QoS and the balance or surplus is signaled as a tolerance for the parameter on one or more sidelinks. The tolerances may be used for allowing a sidelink to exceed a certain parameter by the tolerance while still achieving the overall QoS for the connection between a remote UE and a destination.

Third Aspect

A third aspect of the present invention implements the reflective QoS concept at the relay.

Fourth Aspect

A fourth aspect of the present invention implements the early BSR at the relaying entity.

Figure 6:
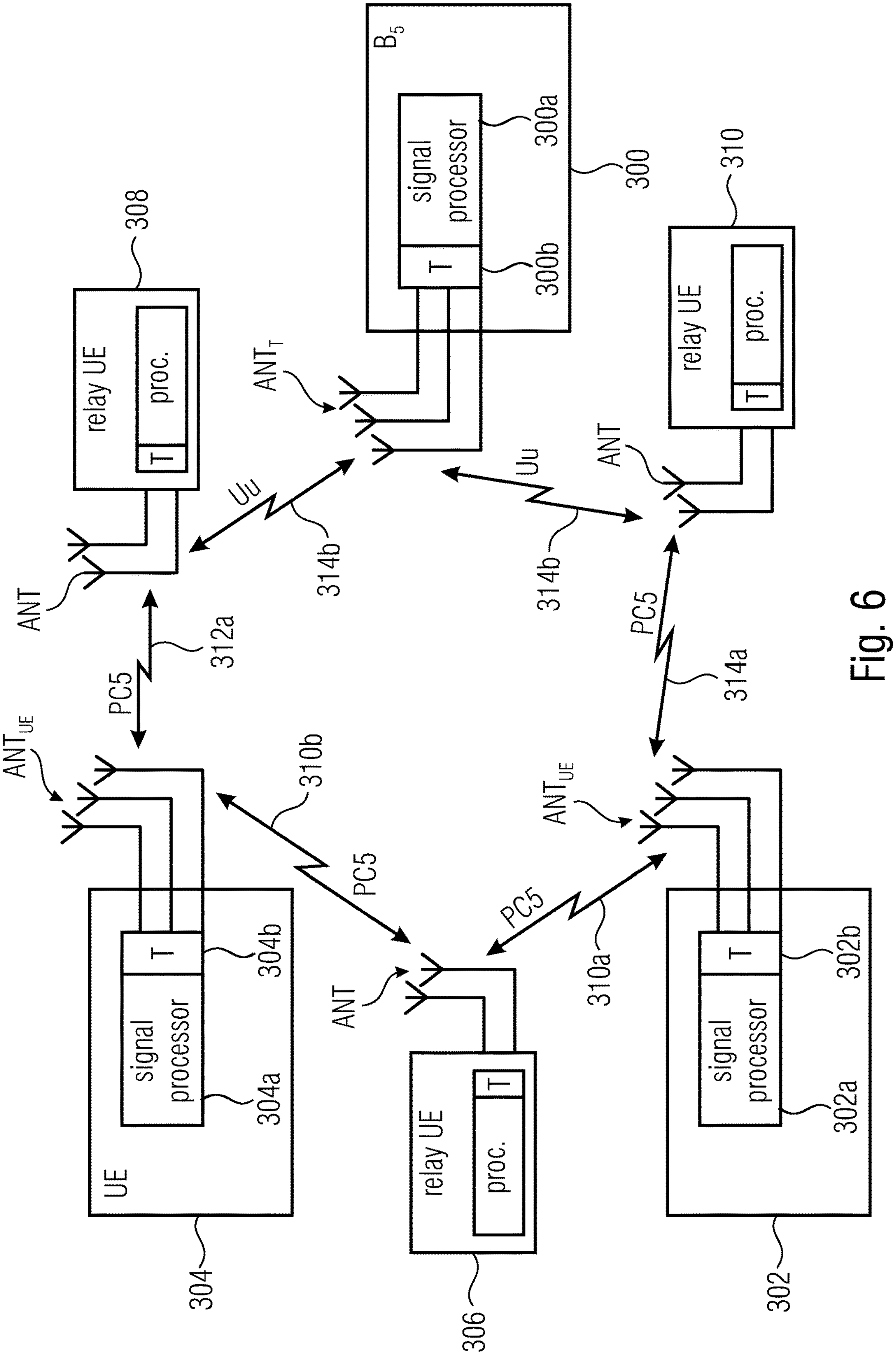
FIG. 6 is a schematic representation of a wireless communication system including a transmitter, like a base station, one or more receivers, like user devices, UEs, and one or more relay UEs for implementing embodiments of the present invention.

Embodiments of the present invention may be implemented in a wireless communication system as depicted in FIG. 1 including base stations and users, like mobile terminals or IoT devices. FIG. 6 is a schematic representation of a wireless communication system including a transmitter 300, like a base station or gNB, one or more user devices, UEs, 302, 304 and one or more relaying entities or relay nodes 306, 308 and 310, like relay UEs, for implementing embodiments of the present invention. The transmitter 300 and the receivers 302, 304 may communicate via the respective relaying entities 306, 308, 310 using respective wireless communication links or channels 310*a*, 310*b*, 312*a*, 312*b* and 314*a*, 314*b*, like respective radio links. The transmitter 300 may include one or more antennas $ANT_T$ or an antenna array having a plurality of antenna elements, a signal processor 300*a* and a transceiver 300*b*, coupled with each other. The receivers 302, 304 include one or more antennas $ANT_{UE}$ or an antenna array having a plurality of antennas, a signal processor 302*a*, 304*a*, and a transceiver 302*b*, 304*b* coupled with each other. Each of the relaying entities 306, 308, 310 includes one or more antennas ANT or an antenna array having a plurality of antennas, a signal processor, and a transceiver T coupled with each other. The base station 300 and the UE 302 may communicate via the relaying entity 310 using the wireless communication link 314*b*, like a radio link using the Uu interface or another 3GPP or non-3GPP interface, between the base station 300 and the relaying entity 310, and using the wireless communication link 314*a*, like a radio link using the PC5/sidelink, SL, interface, between the UE 302 and the relaying entity 310. Likewise, the base station 300 and the UE 304 may communicate via the relaying entity 308 using the wireless communication link 312*b*, like a radio link using the Uu interface, between the base station 300 and the relaying entity 308, and using the wireless communication link 312*a*, like a radio link using the SL interface, between the UE 304 and the relaying entity 308. The UEs 302, 304 may communicate with each other via the relaying entity 306 using the wireless communication link 310*a*, like a radio link using the SL interface, between the UE 302 and the relaying entity 306, and using the wireless communication link 310*b*, like a radio link using the SL interface, between the UE 304 and the relaying entity 310. Any one of the system or network, the one or more UEs 302, 304, the one or more relaying entities 306-310 and/or the base station 300, as illustrated in FIG. 6, may operate in accordance with the inventive teachings described herein. In the following description, the relaying entity is referred to as relay UE.

Relay UE Providing Sidelink QoS Status

The present invention provides a user device, UE, for a wireless communication network,

- wherein the UE is to act as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS,
- wherein the UE is connected via a sidelink to one or more of the following:
  - one or more of the remote UEs,
  - the destination,
  - one or more further relay UEs,
- wherein the UE is to determine a status of the sidelink with regard to the predefined or negotiated QoS, and
- wherein the UE is to send the status of the sidelink towards a network entity, like a base station, of the wireless communication network.

In accordance with embodiments, the UE is connected

- over a first sidelink to one or more of the remote UEs and/or to one or more further relay UEs and over a second sidelink to the destination, in case the destination a further UE, or
- over a first sidelink to one or more of the remote UEs and/or to one or more further relay UEs and over a second sidelink to one or more further relay UEs, or
- over a sidelink to one or more of the remote UEs and/or to one or more further relay UEs and over a network link to the destination.

In accordance with embodiments, the sidelink comprises a 3GPP access link, like a PC5 connection, or a non-3GPP access link, like a Bluetooth or WiFi connection.

In accordance with embodiments,

- in case the UE is connected to the network entity, like a base station, for example over the Uu interface, the UE is to send the status of the sidelink to the network entity, or
- in case the UE is not connected to the network entity, like a base station, the UE is to send the status to the network entity via a further relay UE connected to the network entity, the UE connected to the further relay UE directly or via one or more other relay UEs.

In accordance with embodiments, the UE is configured with a Quality-of-Service, QoS, profile for the sidelink for providing the predefined or negotiated QoS between the remote UE and the destination via the UE, the QoS profile enabling or activating the UE to determine and signal the status of the sidelink.

In accordance with embodiments, to determine the status of the sidelink, the UE is to measure on the sidelink one or more QoS parameters associated with the predefined or negotiated QoS.

In accordance with embodiments, the UE is to signal the status using Radio Resource Control, RRC, signaling or using a Media Access Control, MAC, Control Element, CE.

In accordance with embodiments, the status

- indicates that the sidelink no longer fulfils or fulfills again the predefined or negotiated QoS on the sidelink and/or the predefined or negotiated QoS between the remote UE and the destination, e.g., by sending a QoS failure report, QoS_FR, or
- indicates a measurement result of the one or more QoS parameters associated with the predefined or negotiated QoS on the sidelink, e.g., by sending a QoS Measurement Report, QoS_MR, or
- indicates that the sidelink is capable to support a higher QoS than the predefined or negotiated QoS, e.g., by sending a QoS update report, QoS_UP.

In accordance with embodiments, in case the UE acts as a relaying entity for a plurality of remote UEs, the QoS_FR indicates which of the sidelinks connecting the remote UEs to the UE do not fulfil or satisfy the predefined or negotiated QoS.

In accordance with embodiments, the UE is to predict a QoS failure using one or more predefined parameters on the sidelink, and is to send an early QoS_FR responsive to predicting a QoS failure, wherein the one or more predefined parameters may include one or more of:

- a Reference Signal Received Power, RSRP, measured over a predefined time window,
- Channel State Information, CSI, obtained over the predefined time window,
- beam measurements and/or beam failures,
- a Hybrid Acknowledge Request, HARQ, feedback over the predefined time window, e.g., a certain number or a certain ratio of Non-Acknowledgments, NACKs, during the predefined time window,
- a limitation of the transmit power at the UE,
- a limitation of the battery power at the UE,
- a limitation of the computational power at the UE,
- a congestion of the link, like the sidelink, to the remote UE indicated by, e.g., the Channel Busy Ratio, CBR, or the Channel occupancy Ratio, CR,
- one or more of the Bit Error Rate, BER, the Packet Error Rate, PER, packet loss or packet delay over the predefined time window.

In accordance with embodiments, before sending the QoS_FR for the sidelink, the UE is to attempt a transmission on the sidelink using other resources, wherein the UE is not to send the QoS_FR in case the transmission using the other resources meets the predefined or negotiated QoS.

In accordance with embodiments, the UE is to send the QoS_MR

- periodically, and/or
- responsive to a request, and/or
- responsive to a failure, and/or
- responsive to one or more events.

In accordance with embodiments, the one or more events may include one or more of the following:

- the QoS_MR changes with regard to one or more measurement items significantly when compared to a previous QoS_MR, e.g., when the change of the one or more measurement items of the QoS_MR is higher than a configured or pre-configured threshold,
- one or more of the QoS parameters on the sidelink reach a configured or preconfigured threshold,
- one or more of radio link failure, beam recovery procedure or beam failure, synchronization failure or high interference condition,
- one or more of the QoS parameters on the sidelink differ from configured QoS parameters by more than a configured or preconfigured threshold,
- a configured or preconfigured counter indicating a number of HARQ failures or retransmissions on the sidelink is reached.

In accordance with embodiments, the UE is to send the QoS_UP responsive to

- improvements in the measured QoS parameters allowing to satisfy a QoS being higher than the predefined or negotiated QoS, or
- a previously send QoS_FR and improvements in the measured QoS parameters allowing the predefined or negotiated QoS to be satisfied again, or
- the expiry of a configured or preconfigured time window after sending a QoS_FR, or
- a query.

Relay UE Using Reflective QoS

The present invention provides a user device, UE, for a wireless communication network,

- wherein the UE is to act as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and
- wherein the UE is connected via a sidelink to one or more of the following:
  - one or more of the remote UEs,
  - the destination,
  - one or more further relay UEs, and wherein, responsive to receiving from the destination or from the remote UE or from another relaying entity a first transmission, like a packet, associated with the Reflective Quality-of-Service, QoS, Indicator, RQI, and/or Relay QoS Packet Processing Information, RPPQI, the UE is to process a second transmission to the destination, to the remote UE or to the other relay in accordance with the QoS associated with the first transmission.

In accordance with embodiments, the UE is to apply to the second transmission a QoS flow to data radio bearer, DRB, mapping based on the RQI or the RPPQI provided in the for the first transmission.

In accordance with embodiments, the RPPQI includes one or more of:

an indication of how the transmission is to be treated for a communication from the UE to the destination or to the remote UE or to the other relaying entity, information about scheduling requirements for the communication between the UE and the destination or the remote UE or the other relaying entity, information about DRB mapping requirements for the communication between the UE and the destination or the remote UE or the other relaying entity.

In accordance with embodiments, the UE is to receive from the destination or the remote UE or from another relaying entity, together with a transmission to be relayed to the remote UE, scheduling information, e.g., RPPQI, for sending a response from the UE to the destination or to the other relaying entity.

In accordance with embodiments, the scheduling information includes one or more of:

a dedicated set of resources for the communication from the UE to the destination or the remote UE or to the other relaying entity, a semi-static or semi-persistent set of resources for the communication from the UE to the destination or to the other relaying entity.

Relay UE Using Early BSR

The present invention provides a user device, UE, for a wireless communication network, wherein the UE is to act as a relaying entity so as to provide functionality to support connectivity between the one or more remote UEs and a destination of the wireless communication network, wherein a connection between the remote UE and the destination via the UE is associated with a predefined or negotiated Quality-of-Service, QoS, and wherein the UE is connected via a sidelink to one or more of the following:

one or more of the remote UEs, the destination, one or more further relay UEs, and wherein, responsive to one or more criteria, the UE is to trigger an early Buffer Status Report, BSR.

In accordance with embodiments, the one or more criteria include one or more of the following:

a queuing capability or capacity of the UE for data to be received or to be sent, the UE predicts the predefined or negotiated QoS between the remote UE and the destination to be no longer fulfillable, the UE receives a BSR report from the one or more remote UEs, a change in the QoS requested by a remote UE, a predefined number of consecutive NACKs as HARQ feedback responses, a preconfigured or configured ratio of HARQ NACKs within a preconfigured or configured time window.

In accordance with embodiments, to predict the QoS between the remote UE and the destination, the UE is to measure on the sidelink one or more QoS parameters associated with the predefined or negotiated QoS.

In accordance with embodiments, the UE is to trigger an early Buffer Status Report, BSR, for a duration of a Packet Data Unit, PDU, session with a remote UE.

In accordance with embodiments, the UE is to use QoS assistance information, QoS_AI, e.g., from a QoS manager of the wireless communication network, the QoS_AI including tolerances for the one or more QoS parameters on the sidelink.

In accordance with embodiments, the UE includes the QoS manager or is connected to the QoS manager which is located at the remote UE or at a further relay UE or at the destination or at a network entity of the wireless communication network.

In accordance with embodiments, the tolerances are determined by the QoS manager based on the number of hops between the remote UE and the destination and/or using measurements of QoS parameters associated with the predefined or negotiated QoS on one or more or all of the links between the remote UE and the destination.

In accordance with embodiments, in case the QoS manager is located in a network entity of the wireless communication network, and in case the connection between the one or more remote UEs and the destination comprises the UE and one or more further UEs act as a relaying entity, the UE is to act as an anchor relay UE, the anchor relay UE being the only UE acting as a relay that communicates with the QoS Manager.

In accordance with embodiments, the UE is to receive from the remote UE or from the destination or from the network entity a signaling informing the UE to act as the anchor relay UE.

In accordance with embodiments, the tolerances include:

aggregated tolerances for the one or more sidelinks between some or all of a plurality of the remote UEs and the UE, or one or more remote UEs specific tolerances for the sidelink between a specific remote UE and the UE.

In accordance with embodiments, the aggregated tolerances are to be associated with non-GBR traffic, and the UE specific tolerances are to be associated with GBR traffic, and the relay UE is to trigger a load balancing reselection by signaling to any remote UE or any further relay UE subscribing to or handling non-GBR traffic, when one or more of the QoS parameters are not fulfilled.

In accordance with embodiments, the load balancing reselection is signaled as one or more of:

an RRC message, an RLC message, a MAC CE, a physical layer signal, e.g., on a physical layer feedback or control channel, like the PSFCH or the PSCCH, a higher layer signaling, e.g., the application layer.

In accordance with embodiments, the destination comprises another UE of the wireless communication network or an entity of the core network of the wireless communication network or an entity of the access network of the wireless communication network.

In accordance with embodiments, the user device comprises one or more of the following: a mobile terminal, or a stationary terminal, or a cellular IoT-UE, or a vehicular UE, or a leader, GL, UE, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit, RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Base Station Receiving QoS Staus of Sidelink

The present invention provides a network entity, like a base station, for a wireless communication network,

- wherein the network entity is to communicate with one or more relaying entities, the relaying entity providing functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the relay UE is connected via a sidelink to one or more of the following:
  - one or more of the remote UEs,
  - the destination,
  - one or more further relay UEs, and
- wherein the network entity is to receive from the relaying entity a status of the sidelink with regard to the predefined or negotiated QoS.

In accordance with embodiments, the sidelink comprises a 3GPP access link, like a PC5 connection, or a non-3GPP access link, like a Bluetooth or WiFi connection.

In accordance with embodiments, wherein the status

- indicates that the sidelink no longer fulfils or fulfills again the predefined or negotiated QoS on the sidelink and/or the predefined or negotiated QoS between the remote UE and the destination, e.g., in form of a QoS failure report, QoS_FR, or
- indicates a measurement result of the one or more QoS parameters associated with the predefined or negotiated QoS on the sidelink, e.g., in form of a QoS Measurement Report, QoS_MR, or
- indicates that the sidelink is capable to support a higher QoS than the predefined or negotiated QoS, e.g., in form of a QoS update report, QoS_UP.

In accordance with embodiments, responsive to receiving the status, the network entity is to

- generate and send a QoS notification to a core network entity of the wireless communication network, or
- modify the connection to the remote UE, e.g., by triggering a relay reselection process, in case one or more other relaying entities are connected to the network entity.

In accordance with embodiments, responsive to the QoS on the sidelink falling below a predefined threshold, the network entity is to modify the connection to the remote UE responsively or is to trigger a relay reselection process.

In accordance with embodiments, the network entity comprises one or more of the following: a macro cell base station, or a small cell base station, or a central unit of a base station, or a distributed unit of a base station, a IAB node, or a road side unit, RSU, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

QoS Manager

The present invention provides an apparatus for a wireless communication network, the wireless communication network including one or more relaying entities providing functionality to support connectivity between the one or more remote UEs and a destination, wherein a connection between the remote UE and the destination comprises one or more sidelinks, each sidelink associated with a predefined or negotiated Quality-of-Service, QoS, wherein the relay UE is connected via a sidelink to one or more of the following:

- one or more of the remote UEs,
- the destination,
- one or more further relay UEs, and
- wherein, using measurements of QoS parameters associated with the predefined or negotiated QoS on one or more or all of the links between the remote UE and the destination, the apparatus is to determine or calculate and/or to signal to the relaying entity, e.g., as QoS assistance information, QoS_AI, a tolerance for the QoS parameters associated with a predefined or negotiated QoS parameter on the sidelink, and
- wherein the apparatus is located at the remote UE, at a relaying entity, at the destination or at a network entity of the wireless communication network.

In accordance with embodiments, the apparatus is to determine or calculate a tolerance for the QoS parameters based on the number of hops between the remote UE and the destination and/or measurements of the individual links between the remote UE and the destination.

In accordance with embodiments, the QoS_AI includes tolerances for one or more of the following QoS parameters:

- a Guaranteed Flow Bit Rate, GFBR,
- a Maximum Flow Bit Rate, MFBR,
- a maximum packet loss,
- a Packet Delay Budget, PDB,
- a Packet Error Rate, PER,
- an Aggregated Maximum Bit Rate, AMBR, per remote UE or session,
- a queueing load or capacity or capability per remote UE or session,
- a sidelink congestion, e.g., the Channel Busy Ratio, CBR, or the Channel occupancy Ratio, CR CBR or CR.

In accordance with embodiments, the apparatus is to provide, after sending a first QoS_AI, e.g., an initial QoS_AI, a second QoS_AI indicating an update for one or more of the tolerances and/or tolerances for one or more additional QoS parameters.

In accordance with embodiments, the apparatus is to provide the second QoS_AI responsive to receiving from one or more of the relaying entities a measurement result of the one or more QoS parameters associated with the predefined or negotiated QoS on the sidelink, e.g., by receiving a QoS Measurement Report, QoS_MR.

In accordance with embodiments, the QoS_AI includes

- aggregated tolerances for the sidelinks between some or all of a plurality of the remote UEs and/or further relay UEs and the UE, or
- one or more remote UE specific or further relay UE specific tolerances for the sidelink between a specific remote UE and the UE.

In accordance with embodiments, the aggregated tolerances are be associated with non-GBR traffic, and the UE specific tolerances are to be associated with GBR traffic, and the QoS_AI includes an indication allowing the relay UE to trigger a load balancing reselection signal to any remote UE or any further relay UE subscribing to or handling non-GBR traffic, when one or more of the QoS parameters are not fulfilled.

In accordance with embodiments, the apparatus is to signal the QoS_AI using RRC signaling, e.g., as a part of an RRC_Reconfiguration message or an RRCSetup message.

Network

The present invention provides a wireless communication network, comprising one or more remote user devices, remote UE, and one or more user devices, relaying entity, of the present invention providing functionality to support connectivity between the one or more remote UEs and a destination.

In accordance with embodiments, the wireless communication network further comprises one or more network entities of the present invention and/or one or more QoS managers of the present invention.

In accordance with embodiments, the wireless communication network comprises one or more single-hop connections between a remote UE and the destination, and/or one or more multi-hop connections between a remote UE and the destination.

In accordance with embodiments, the destination comprises another UE of the wireless communication network or an entity of the core network or the access network of the wireless communication network.

In accordance with embodiments, the entity of the core network or the access network comprises one or more of the following: a macro cell base station, or a small cell base station, or a central unit of a base station, or a distributed unit of a base station, or a road side unit, RSU, or an AMF, or an MME, or an SMF, or a core network entity, or mobile edge computing, MEC entity, or a network slice as in the NR or 5G core context, or any transmission/reception point, TRP, enabling an item or a device to communicate using the wireless communication network, the item or device being provided with network connectivity to communicate using the wireless communication network.

Methods

The present invention provides a method for operating a user device, UE, for a wireless communication network, wherein the UE acts as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the UE is connected via a sidelink to one or more of the following:

one or more of the remote UEs, the destination, one or more further relay UEs, the method comprising:

determining a status of the sidelink with regard to the predefined or negotiated QoS, and sending the status of the sidelink towards a network entity, like a base station, of the wireless communication network.

The present invention provides a method for operating a user device, UE, for a wireless communication network, wherein the UE acts as a relaying entity so as to provide functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the UE is connected via a sidelink to one or more of the following:

one or more of the remote UEs, the destination, one or more further relay UEs, and the method comprising:

responsive to receiving from the destination or from the remote UE or from another relaying entity a first transmission, like a packet, associated with the Reflective Quality-of-Service, QoS, Indicator, RQI, and/or Relay QoS Packet Processing Information, RPPQI, processing a second transmission to the destination, to the remote UE or to the other relay in accordance with the QoS associated with the first transmission.

The present invention provides a method for operating a user device, UE, for a wireless communication network, wherein the UE acts as a relaying entity so as to provide functionality to support connectivity between the one or more remote UEs and a destination of the wireless communication network, wherein a connection between the remote UE and the destination via the UE is associated with a predefined or negotiated Quality-of-Service, QoS, and wherein the UE is connected via a sidelink to one or more of the following:

one or more of the remote UEs, the destination, one or more further relay UEs, and the method comprising:

responsive to one or more criteria, triggering an early Buffer Status Report, BSR.

The present invention provides a method for operating a network entity, like a base station, for a wireless communication network, wherein the network entity is to communicate with one or more relaying entities, the relaying entity providing functionality to support connectivity between one or more remote UEs and a destination of the wireless communication network, wherein a connection between the remote UE and the destination comprises one or more sidelinks, each sidelink associated with a predefined or negotiated Quality-of-Service, QoS, and wherein the relay UE is connected via a sidelink to one or more of the following: one or more of the remote UEs, the destination, one or more further relay UEs, and the method comprising:

receiving from the relaying entity a status of the sidelink with regard to the predefined or negotiated QoS.

The present invention provides a method for operating an apparatus for a wireless communication network, the wireless communication network including one or more relaying entities providing functionality to support connectivity between the one or more remote UEs and a destination, wherein a connection between the remote UE and the destination comprises one or more sidelinks, each sidelink associated with a predefined or negotiated Quality-of-Service, QoS, wherein the apparatus is located at the remote UE, at a relaying entity, at the destination or at a network entity of the wireless communication network, and wherein the relay UE is connected via a sidelink to one or more of the following:

one or more of the remote UEs, the destination, one or more further relay UEs, and the method comprising:

using measurements of QoS parameters associated with the predefined or negotiated QoS on one or more or all of the links between the remote UE and the destination, determining or calculating and/or to signaling to the relaying entity, e.g., as QoS assistance information, QoS_AI, a tolerance for the QoS parameters associated with a predefined or negotiated QoS parameter on the sidelink.

Computer Program Product

Embodiments of the first aspect of the present invention provide a computer program product comprising instructions which, when the program is executed by a computer, causes the computer to carry out one or more methods in accordance with the present invention.

First Aspect

Figure 7A:
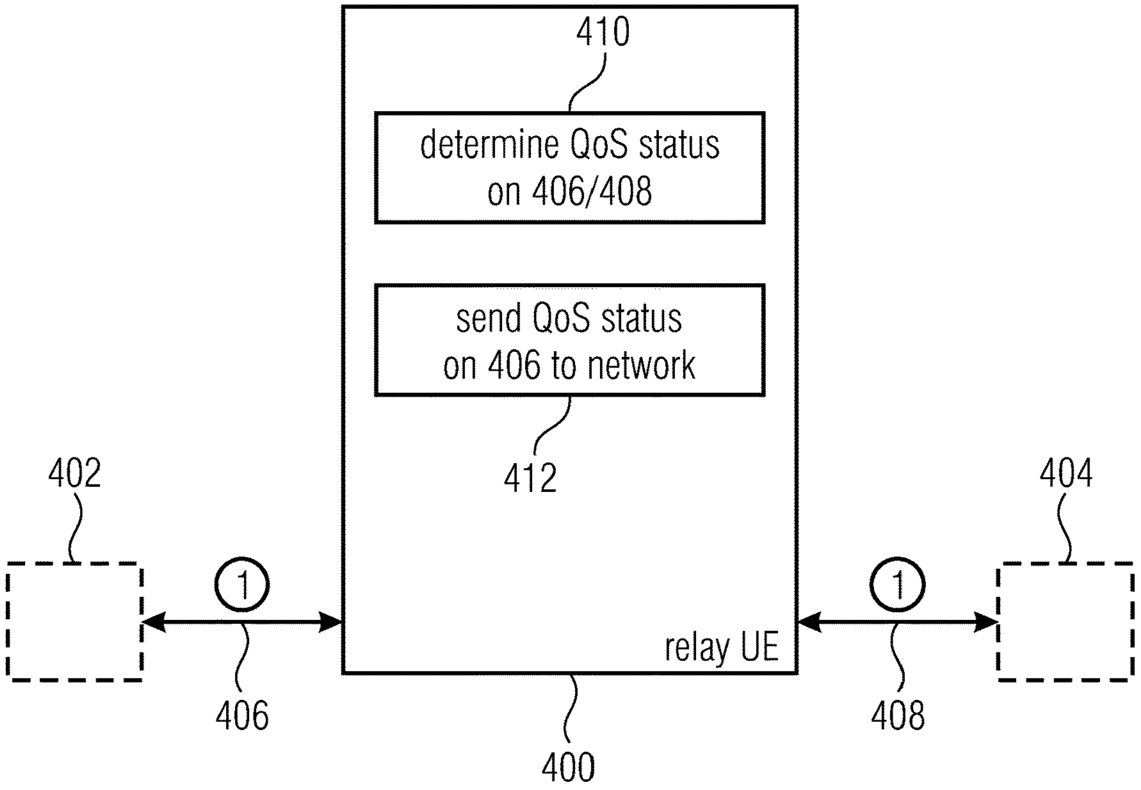
FIG. 7*a* illustrates a relay UE in accordance with embodiments of the first aspect of the present invention.
Figure 7B:
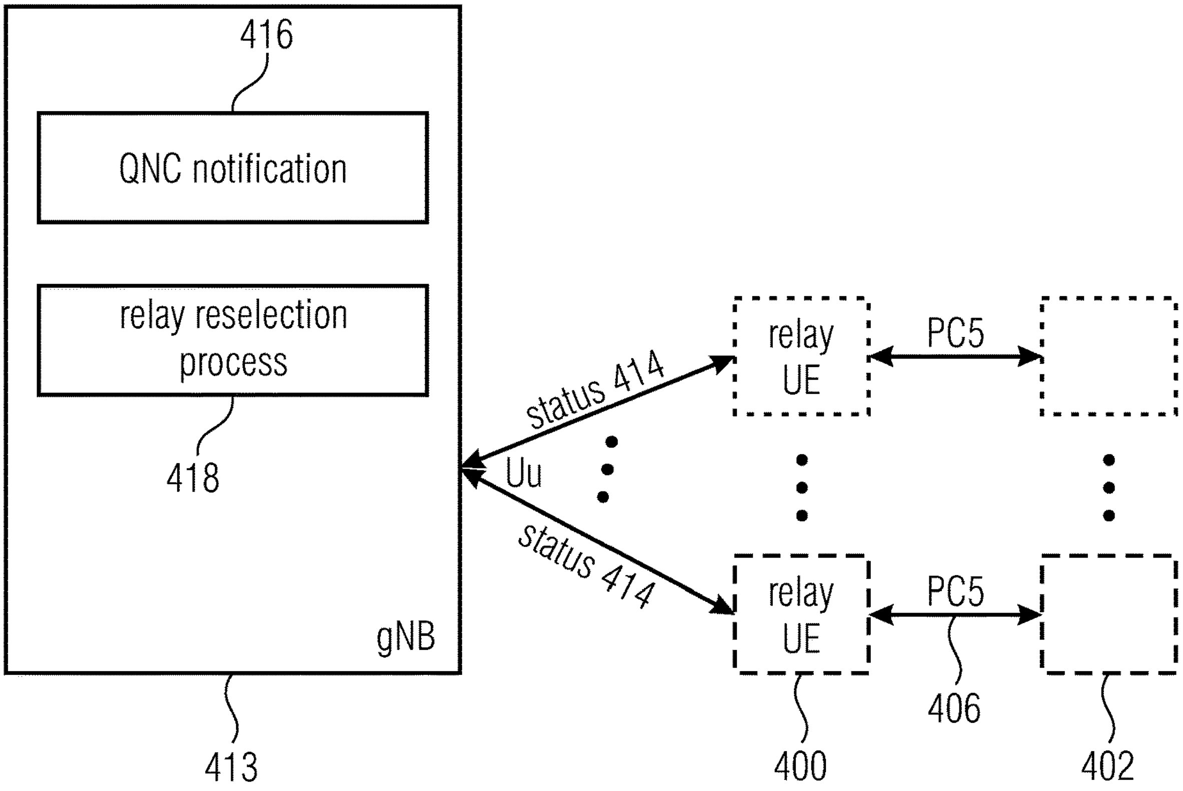
FIG. 7*b* illustrates a gNB in accordance with embodiments of the first aspect of the present invention.

Embodiments of the first aspect of the present invention are now described. FIG. 7(*a*) illustrates a UE 400 in accordance with embodiments of the first aspect of the present invention. The UE 400 acts a relay UE so as to provide functionality to support connectivity between one or more remote UEs 402 and a destination 404, like another UE, another relay UE or a network entity of a wireless communication system or network, like the system or network described above with reference to FIG. 1. The connection between the remote UE and the destination comprises one or more sidelinks, and each sidelink is associated with a predefined or negotiated Quality-of-Service, QoS. The relay UE 400 is connected to a first entity 402 via a first link or connection 406, and the relay UE 400 is connected to a second entity 404 via a second link or connection 408. When acting as a relay, relay UE 400 relays a communication between a remote and a destination over the first and second connections 406, 408, for example by relaying a transmission ① received over the first connection 406, like data or one or more data packets and the associated control data, over the second connection 408, or vice versa. The first entity 402 may be a remote UE or another or further relay UE, and the second entity 404 may by the destination or a another UE or a further relay UE. The destination may be another UE of the wireless communication network or an entity of the core network of the wireless communication network or an entity of the access network of the wireless communication network. Although FIG. 4(*a*) illustrates that the relay UE 400 is connected to one first entity 402 and one second entity 404, in accordance with further embodiments, the relay UE 400 may be connected to a plurality of first entities and/or a plurality of second entities. The first connection 406 connecting the UE 400 and the first entity 402 is a sidelink connection. The second connection 408 connecting the UE 400 and the second entity 404 is also a sidelink connection, in case the second entity is a remote UE, another relay UE or a destination being a another UE. The sidelink may be a 3GPP access link, like a PC5 connection, or a non-3GPP access link, like a Bluetooth or WiFi connection. In case the destination is an entity of the core network or an entity of the access network, the second link 408 is a network link, for example a 3GPP access link, like a Uu connection, or a non-3GPP access link, like a Bluetooth or WiFi connection.

Thus, in accordance with embodiments, the relay UE may be connected over a first sidelink to one or more of the remote UEs and/or to one or more further relay UEs and over a second sidelink to the destination, in case the destination a further UE, or over a first sidelink to one or more of the remote UEs and/or to one or more further relay UEs and over a second sidelink to one or more further relay UEs, or over a sidelink to one or more of the remote UEs and/or to one or more further relay UEs and over a network link to the destination.

The relay UE 400 determines a status of the one or more sidelinks the UE uses to connect to the first and second entities 402, 404 with regard to the predefined or negotiated QoS associated with the respective sidelink as is indicated at 410, and sends the status of the sidelink toward a network entity, like a base station, of the wireless communication network as is indicated at 412. In case the relay UE 400 is connected to the network entity, like a base station, it sends the status of the sidelink to the network entity directly. In case the relay UE 400 is not connected to the network entity, like a base station, it sends the status to the network entity indirectly via a further relay UE connected to the network entity. The further relay UE connected to the network entity may also be referred to as an anchor relay.

In accordance with embodiments, the relay UE may receive a QoS profile for the sidelink for providing the negotiated or overall QoS between the remote UE 402 and the destination 404, and the QoS profile may enable or activate determining and/or signaling of the QoS status of the sidelink at the relay UE 400. Determining the QoS status on the sidelink 406 allows the relay UE, in accordance with embodiments, to send a notification in case the negotiated QoS between the remote UE 402 and the destination 404 is no longer fulfillable on the sidelink. In case such a situation occurred and is resolved, i.e., the QoS can be fulfilled again, a corresponding notification may be sent by the relay UE.

FIG. 7(*b*) illustrates a network entity 413, like a base station, in accordance with embodiments of the first aspect of the present invention. The network entity 409 may be the destination or it may be connected to a relay UE 400 without being the destination. The network entity receives from a relay UE 400, directly or indirectly, a notification 414 about the QoS status of a sidelink connecting the relay UE 400 to the first entity and to the second entity, in case the second entity is a sidelink. In accordance with embodiments, at the network entity 413 the QoS notification control, QNC, mechanism is implemented or activated, and, responsive to receiving the status 414, the network entity 413 generates and sends a QoS notification to a core network entity of the wireless communication network, as indicated at 416. In accordance with other embodiments, responsive to receiving the status, the network entity 413 modifies the connection to the remote UE, e.g., by triggering a relay reselection process, in case a plurality of relay UEs are connected to the gNB, as indicated at 418.

Thus, embodiments of the present invention make use of the conventional notification control mechanism also for a sidelink between a relay and a remote UE without the need to implement a direct signaling to the core network. Rather, the conventional QoS notification activated at the gNB may be triggered by the relay by sending the QoS status on the sidelink. In accordance with embodiments, the status may indicate one or more of the following, while it is noted that the subsequent list is not a final or exhaustive list, but that the list may include other notifications:

the GFBR can no longer be guaranteed,
the GFBR can be guaranteed again,
the MFBR can no longer be guaranteed,
the MFBR can be guaranteed again,
the PER can no longer be maintained,
the PER can be maintained again,
the PDB can no longer be satisfied,
the PDB can be satisfied again,
a relay UE queueing load exceeds a reference queueing load.

In accordance with embodiments, the QoS status may indicate that the sidelink 406 no longer fulfils or fulfills again the predefined or negotiated QoS between the remote UE 402 and the destination 404, e.g., by sending a QoS failure report, QoS_FR, or indicate a measurement result of the one or more QoS parameters associated with the predefined or negotiated QoS on the sidelink 406, e.g., by sending a QoS Measurement Report, QoS_MR, or indicate that the sidelink 406 is capable to support a higher QoS than the predefined or negotiated QoS, e.g., by sending a QoS update report, QoS_UP.

For example, the relay UE 400 may measure one or more QoS parameters associated with the predefined or negotiated QoS for the sidelink 406 between the remote UE 402 and the relay UE 400, and in case the measurements indicate that one or more of the QoS parameters are no longer fulfillable, i.e., the UE is not capable to support the predefined or negotiated QoS anymore, the QoS_FR may be transmitted by the relay UE. On the other hand, the UE may provide the measurement results in the QoS_MR at certain times, independent from whether the QoS requirements negotiated may be fulfilled or not. In case the measurements of the QoS parameters indicate that the UE is capable to support a QoS that is higher than the predefined or negotiated QoS, this may be signaled using the QoS_UP.

Failure Indication by the Relay UE-QoS Failure Report—QoS_FR

Figure 8:
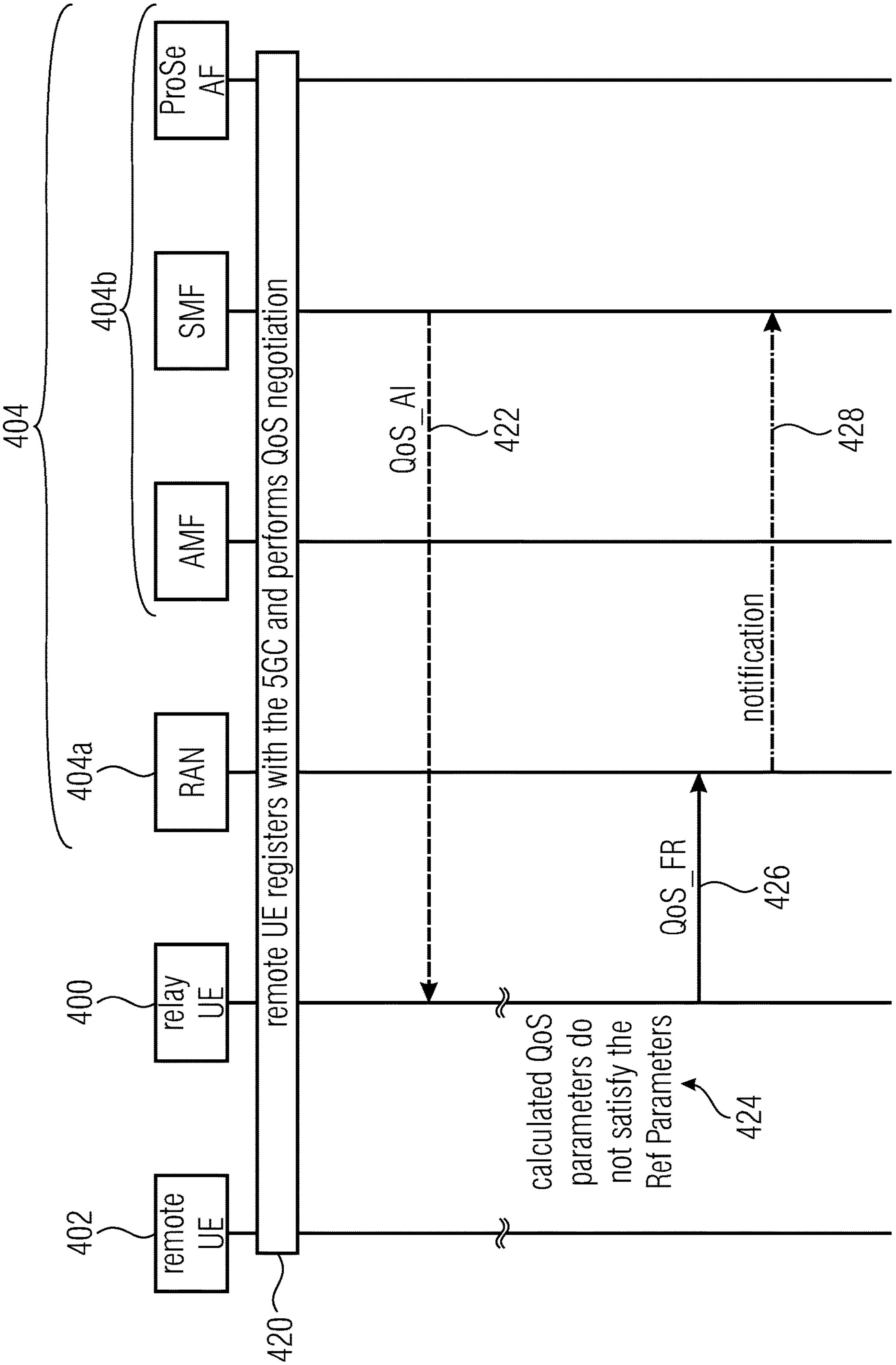
FIG. 8 illustrates a QoS_FR trigger signaling flow in accordance with embodiments of the present invention, in case one or more measured QoS parameters on the sidelink no longer satisfy associated reference parameters.

FIG. 8 illustrates a QoS_FR trigger signaling flow in accordance with embodiments of the present invention, in case one or more measured QoS parameters on the sidelink 406 no longer satisfy associated reference parameters. For example, one of more of the above mentioned rates may be measured, and, in case a measured rate is less than a reference rate, as defined in the QoS profile, the QoS_FR may be send. The QoS_FR may also be send, in case the relay UE queueing load exceeds a reference queueing load as defined in the QoS profile. In the embodiment illustrated in FIG. 8, the relay 400 is a UE-to-network relay for providing connectivity between the remote UE 402 and the destination 404 which includes the RAN 404*a* and the CN 404*b*. The CN, in turn, includes the AMF, the SMF and the ProSe AF. Initially, the remote UE 402 registers with the CN 404*b* and performs a QoS negotiation, as is indicated at 420. Responsive to such QoS negotiation, the SMF provides to the relay UE the one or more QoS parameters associated with the negotiated QoS. In accordance with embodiments of the second aspect of the present invention, which is described in more detail below, in addition to the one or more QoS parameters defined in the QoS profile, so-called QoS assistance information, QoS_AI, may be provided to the relay UE 400, e.g., by the SMF, as is indicated at 422. The QoS_AI defines tolerances for QoS parameters on the sidelink 406. Using the QoS parameters from the QoS profile, optionally in combination with the QoS_AI, the relay UE 400 may perform quantitative calculations 424 to assess the quality of the sidelink 406 for QoS fulfillment. In case the calculations 424 indicate that the QoS requirements are not fulfilled for a given set of resources of the sidelink on which the relay UE 400 attempts, the relay UE 400 triggers the QoS_FR that is transmitted to the RAN 404*a*, as is indicated at 426, which may send a QoS notification to the SMF, as is indicated at 428. The notification 428 indicates to the SMF that the QoS requirements are not satisfied on the sidelink 406. In case more than one remote UE is using the relay UE 400, the relay UE 400 may also indicate which of the remote UEs does not fulfill the QoS requirements. Worded differently, it may be stated which QoS flow can no longer be supported by the access network.

In accordance with embodiments, before actually sending a QoS_FR, the relay UE may attempt the transmission using different resources. For example, in case the relay UE 400 was using a dedicated resource pool meant for relaying, and in case the measurement indicated that this resource pool is congested or overloaded, the relay UE 400 may attempt the transmission using resources from another resource pool that permits a relay transmission or may fall back to resources of a regular resource pool and perform the transmission in case the relay UE, by means of measuring on the respective resources, determines that such resources allow the QoS parameters to be met. In other words, the QoS_FR, in accordance with embodiments, is a kind of last resort by the relay UE once all other possibilities for transmitting a transmission in accordance with the required QoS flow failed.

Figure 9:
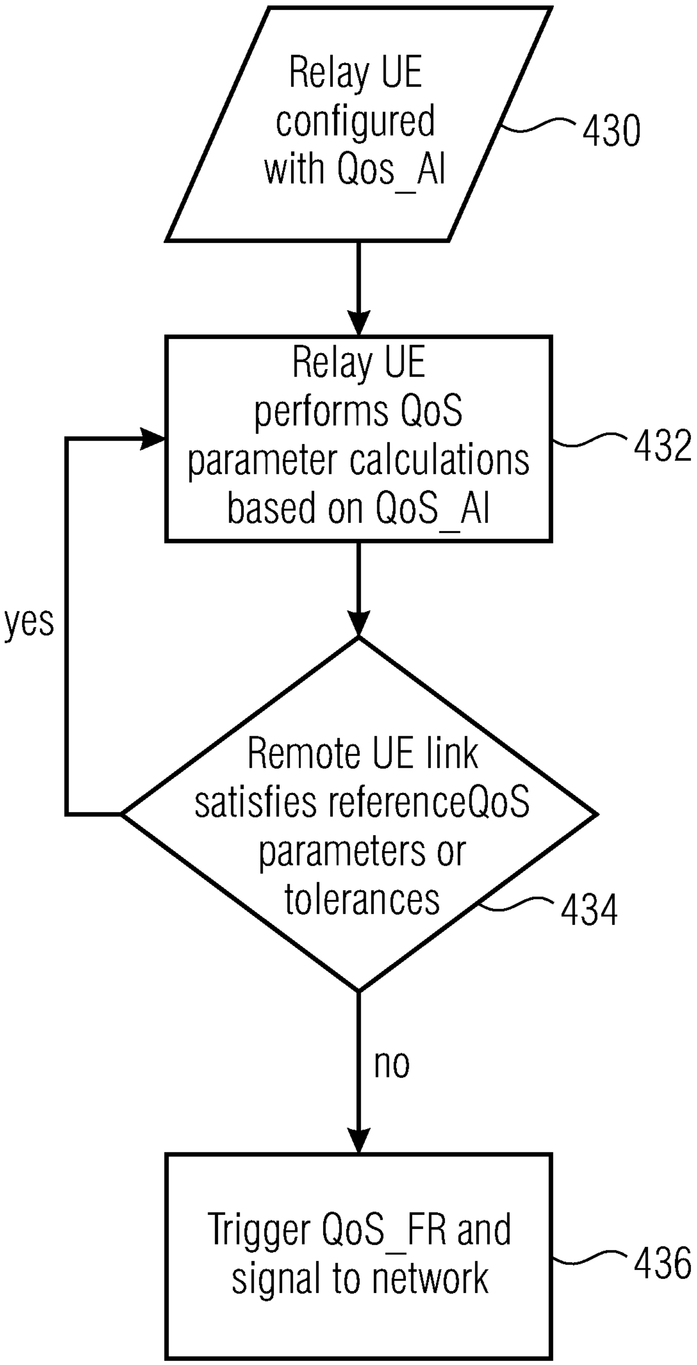
FIG. 9 is a flow diagram illustrating the triggering of a QoS_FR in accordance with embodiments of the present invention.

FIG. 9 is a flow diagram illustrating the triggering of a QoS_FR in accordance with embodiments of the present invention. Initially, as also described with reference to FIG. 8, the relay UE 400 is configured with the QoS parameters, as is indicated at 430. The relay UE 400 performs QoS parameter calculations, as indicated at 432, and determines at 434 whether the remote link 406 satisfies the QoS parameters as defined by the QoS profile, also referred to as reference QoS parameters, or the tolerances as defined by the QoS_AI. In case the calculated QoS parameters satisfy the reference parameters, the process goes back to step 432. In case the QoS parameters as calculated no longer satisfy the reference parameters, the QoS_FR is triggered and signaled to the network, as is indicated at 436.

In accordance with embodiments, the signaling of the QoS_FR may use an RRC signaling or a MAC control element, CE.

In accordance with further embodiments, in addition to the above-mentioned parameters, the following information may be used to predict a QoS for triggering a QoS_FR, for example an early QoS_FR in case the prediction indicates that the QoS is likely to not be maintained in the future. For example, the prediction may be based on a threshold based detection or on a rule based detection and for each of QoS the parameters a detection may be performed. For example, the additional information may include one or more of the following:

a Reference Signal Received Power, RSRP, measured over a predefined time window, Channel State Information, CSI, obtained over the predefined time window, like the Radio Signal Strength Indication, RSSI, the Reference Signal Received Power, RSRP, the Reference Signal Received Quality, RSRQ, or the Precoding Matrix Index, PMI, beam measurements and/or beam failures, a Hybrid Acknowledge Request, HARQ, feedback over the predefined time window, e.g., a certain number or a certain ratio of Non-Acknowledgments, NACKs, during the predefined time window, a limitation of the transmit power at the UE, a limitation of the battery power at the UE, a limitation of the computational power at the UE, a congestion of the link, like the sidelink, to the remote UE indicated by, e.g., the Channel Busy Ratio, CBR, or the Channel occupancy Ratio, CR, one or more of the Bit Error Rate, BER, the Packet Error Rate, PER, packet loss or packet delay over the predefined time window.

In accordance with embodiments, the sidelink congestion may be determined based on a channel busy ratio, CBR or a channel occupancy ratio, CR. As mentioned above, the relay UE may attempt the transmission on other resources before actually sending the QoS_FR, so that responsive to a CBR or a CR associated with a certain resource pool intended for the transmission indicating a congestion, the relay UE may employ resources from another resource pool to attempt the transmission to avoid sending the QoS_FR in case using these additional or different resources satisfy the QoS requirements.

Measurement Reporting from the Relay UE—QoS_MR

In accordance with further embodiments of the present invention, apart from triggering the QoS_FR in case the QoS reference parameters are not being satisfied, the relay UE may also report the status of the QoS parameter calculations using the QoS measurement report, QoS_MR, to the network. The QoS_MR may be reported periodically, aperiodically, in response to a request, or in response to a failure.

Figure 10:
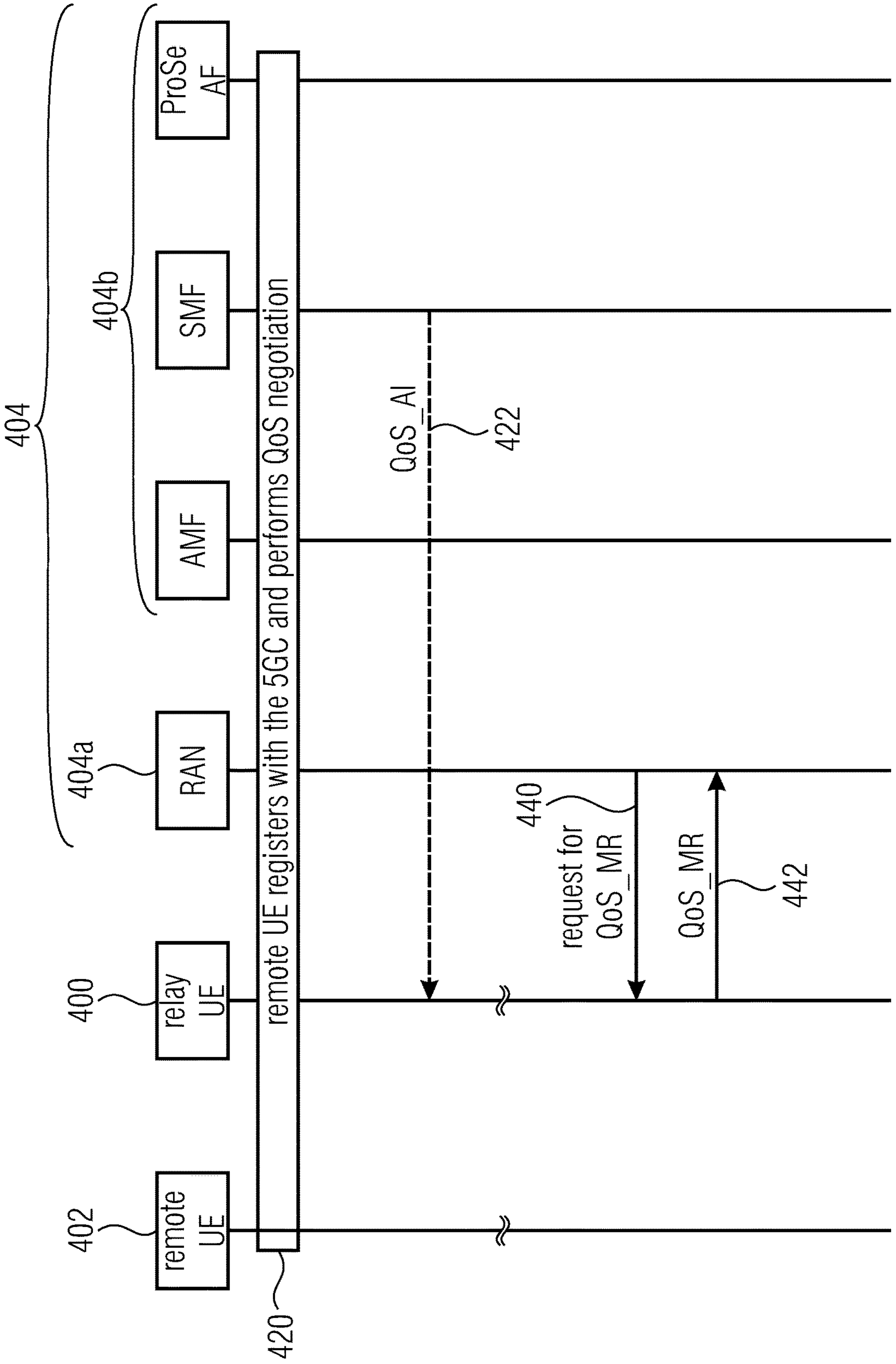
FIG. 10 illustrates the QoS_MR signaling based on a request from the RAN.

FIG. 10 illustrates the QoS_MR signaling based on a request from the RAN. FIG. 10 illustrates a UE-to-network relay UE 400 as described above with reference to FIG. 8 and the negotiation of the QoS and the provision of the QoS_AI to the relay UE 400. The relay UE 400 performs measurements of the QoS parameters and, responsive to a request 440 transmitted from the RAN 404*a* to the relay UE 400, the relay UE 400 sends the QoS_MR 442 to the RAN 404*a*.

In accordance with further embodiments, the relay UE may provide the QoS_MR at certain times, for example periodically, when being configured accordingly, i.e., in such a scenario at the respective configured periodicity, the QoS_MR 442 in FIG. 10 is transmitted by the relay UE 400 to the RAN 404*a* without a preceding request 440.

In accordance with other embodiments, the QoS_MR may be provided by the relay UE 404 aperiodically, for example responsive to certain events. Such events may include one or more of the following:

the QoS_MR changes with regard to one or more measurement items significantly when compared to a previous QoS_MR, e.g., when a change of the one or more measurement items of the QoS_MR is higher than a configured or pre-configured threshold, one or more of a radio link failure, a beam recovery procedure or beam failure, a synchronization failure or a high interference condition, a threshold for one or more values of the QoS_MR is reached—sending the QoS_MR when a threshold for one or more values of the QoS parameters is reached or when they differ from a configured QoS parameter by more than a configured or preconfigured threshold is advantageous as, in this case, the QoS enforcement 444, responsive to receiving the QoS_MR base notification may prevent using an unreasonable remote UE, and the QoS_MR may carry an explicit indication of such a condition to differentiate the QoS_MR from other conditions.

a counter for failures and/or retransmissions in accordance with the feedback mechanism, like the HARQ, is reached, or a change in the QoS.

Figure 11:
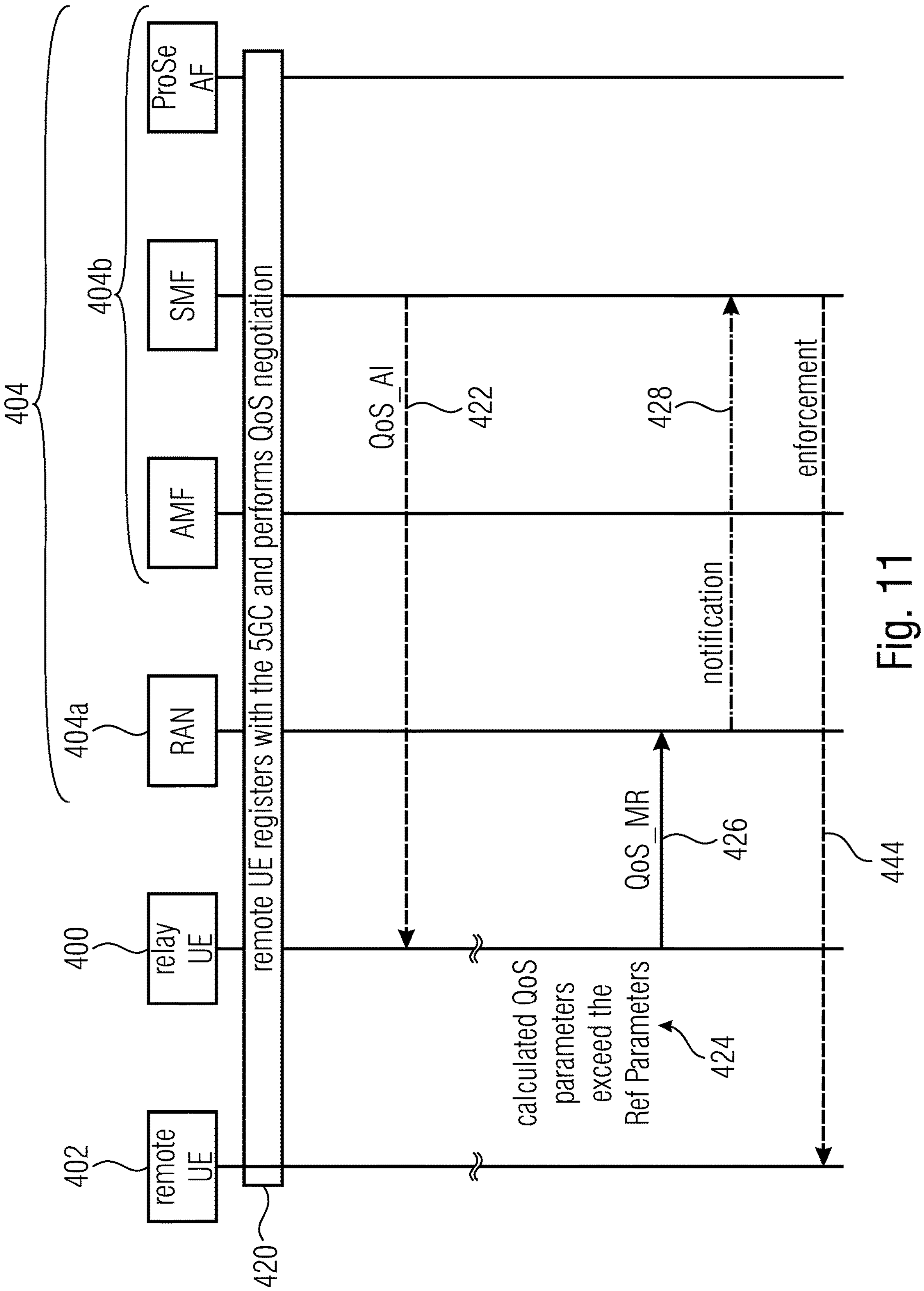
FIG. 11 illustrates the QoS_MR triggering responsive to the calculated parameters exceeding the reference parameters similar to FIG. 8.

In accordance with yet further embodiments, the QoS_MR may also be triggered in case the QoS requirements are not fulfilled and transmitted in place of the QoS_FR. FIG. 11 illustrates the QoS_MR triggering responsive to the calculated parameters exceeding the reference parameters similar to FIG. 8 except that responsive to the calculated QoS parameters exceeding the reference parameters, it is not the QoS_FR that is transmitted to the RAN but the QoS_MR 442. The RAN, responsive to a QoS_MR 442 indicating that the parameters exceed the reference parameters issues the notification to the network, like the SMF, which, in turn, may enforce the QoS with respect to the remote UE, as is indicated at 444. For enforcing the QoS, the network, like the SMF, may initiate an enforcement signal that is transmitted to the remote UE as a NAS message, and the NAS message may be referred to as a NAS-transmission exception, TE.

Figure 12:
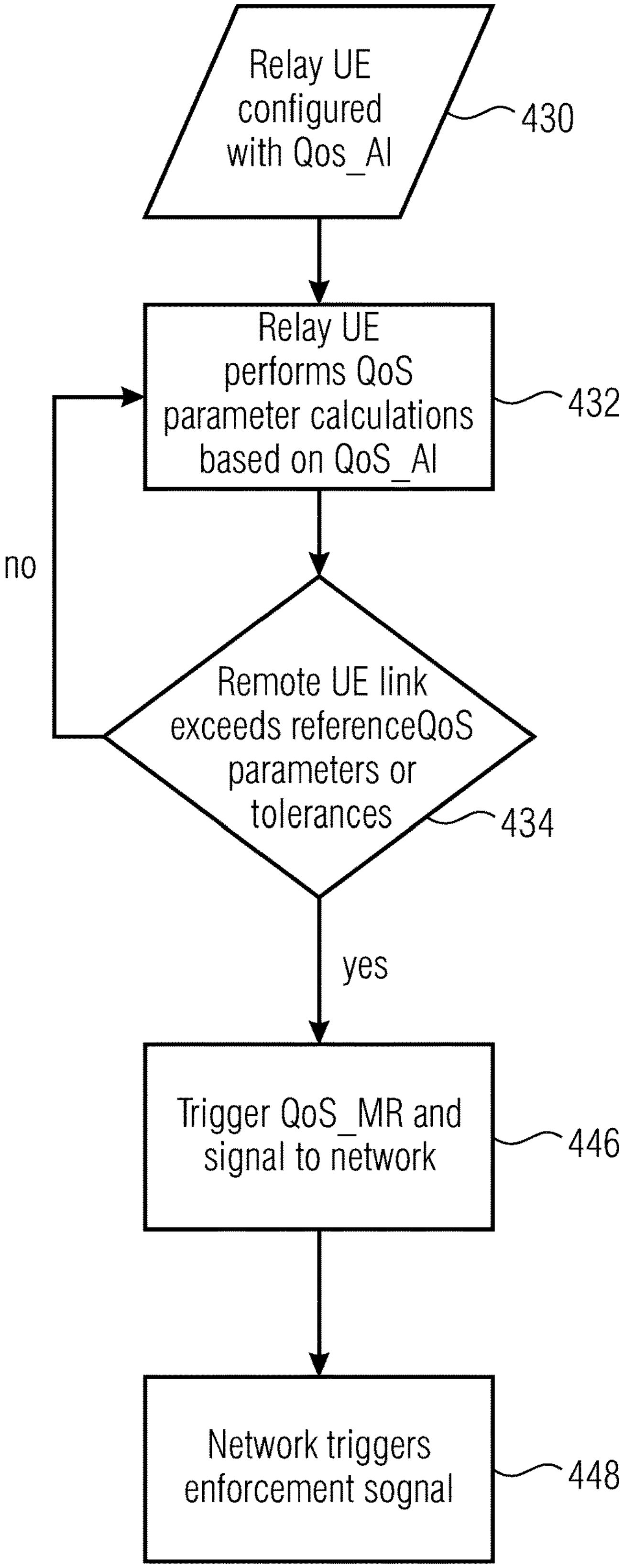
FIG. 12 illustrates a flow diagram for triggering a QoS_MR in accordance with embodiments of the present invention.

FIG. 12 illustrates a flow diagram for triggering a QoS_MR in accordance with embodiments of the present invention. FIG. 12 illustrates steps 430 to 434 already explained above with reference to FIG. 9. In accordance with embodiments triggering a QoS_MR, responsive to the remote UE link exceeding the reference QoS parameters or tolerances at 434, the relay UE triggers the QoS_MR at 446 and signals it to the network which, in turn, triggers an enforcement signal as indicated at 448.

In accordance with the above-described embodiments concerning the QoS_FR and the QoS_MR, the signaling of the QoS_FR or the QoS_MR may use an RRC signaling or a MAC control element, CE. When network receives the QoS_FR or the QoS_MR, either as RRC signal or as MAC CE, the RRC layer or the MAC layer may inform higher layers of the RAN to trigger a notification control mechanism, like the QNC described above with reference to FIG. 3.

In accordance with embodiments, the MAC control element may include the measurement or failure report for a plurality of destination IDs, as illustrated in FIG. 13(*a*), or may include an aggregated measurement and/or failure report as illustrated in FIG. 13(*b*), or a combination thereof, as illustrated in FIG. 13(*c*). For example, the MAC CE indicates which remote UE tolerances cannot be met.

QoS Update from the Relay UE—QoS_UP

In accordance with further embodiments, the relay UE may send a QoS update, QoS_UP, indication in case an improvement with respect to the supportable QoS flows is determined. In other words, in case the measurements performed by the relay UE for a certain link indicate that higher QoS requirements when compared to the currently used QoS requirements are possible, this may be signaled accordingly so as to allow higher QoS communication for the session between a remote UE and the destination.

The QoS_UP may be sent based on a query by the network or responsive a previously sent QoS_FR. In case the QoS_UP is sent after a QoS_FR, in accordance with embodiments, a certain time window is provided before the QoS_UP is signaled so as to avoid sending outdated reports to the network. For example, this is done to avoid hysteresis so as to avoid a toggling signal between sending a QoS_FR and QoS_UP multiple times within a short time period. The time windows can be configured or pre-configured based on a threshold.

Second Aspect

Figure 14A:
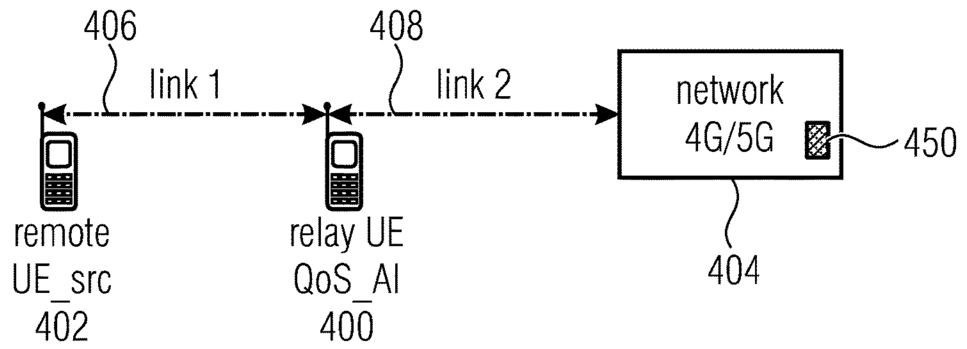
FIG. 14*a-b* illustrates a QoS manager in accordance with embodiments of the second aspect of the present invention, which provides a relay UE with tolerances for one or more of the QoS parameters for the predefined or negotiated QoS.
Figure 14B:
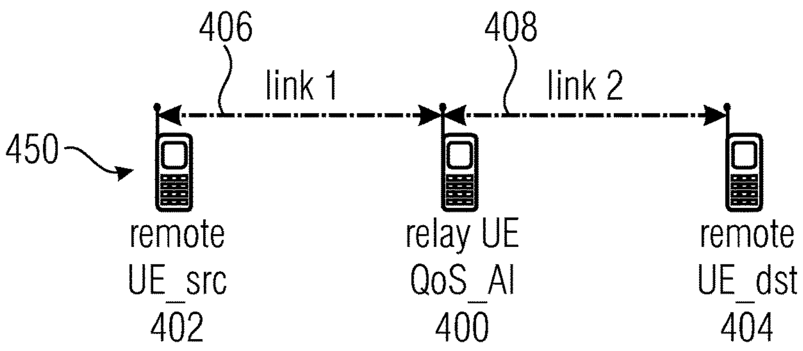

Embodiments of the second aspect of the present invention are now described. FIG. 14 illustrates an embodiment of the second aspect of the present invention concerning an apparatus for the wireless communication network, also referred to in the following as QoS manager, which provides a relay UE with tolerances for one or more of the QoS parameters on the sidelink connecting the relay UE to the first/second entities.

FIG. 14 illustrates the wireless communication network including a remote UE 402 connected via the relay UE 400 over the links 406, 408 to the destination 404. FIG. 14(*a*) illustrates a UE-to-network relay so that the link 406 is a sidelink, the link 408 is a Uu link and the destination 404 is the network. FIG. 14(*b*) illustrates a UE-to-UE relay so that both links 406, 408 are sidelinks, and the destination 404 is another UE, like the final UE to which the remote UE 402 connects or a further relay UE. Further, the QoS manager 450 is illustrated, which may located at the destination, as illustrated in FIG. 14(*a*), or at the remote UE, as illustrated in FIG. 14(*b*), or at the relay UE, or at a network entity of the wireless communication network to which the relay UE is connected. The QoS manager 450 measures QoS parameters associated with the predefined or negotiated QoS on one or more or all of the links 406, 408 between the remote UE 402 and the destination 404 to determine or calculate a tolerance for one or more of the QoS parameters associated with the predefined or negotiated QoS parameter on the sidelink. In accordance with embodiments, a tolerance for the QoS parameters may be determined or calculated based on the number of hops between the remote UE and the destination and the measurements of the individual links between the remote UE and the destination. The QoS manager 450 signals the tolerances to the relay UE 400, e.g., as so-called QoS assistance information, QoS_AI. In other words, once the QoS profiles for the links 406, 408 exist, the QoS manager 450 may measure the links so as to determine or calculate the value for the QoS parameters that are actually achievable. On a certain link, the values for one or more parameters may be above the values actually needed for the predefined or negotiated QoS and the balance or surplus is signaled as the tolerance for the QoS parameter on the sidelink. The tolerances may be used by the relay UE 400 for allowing the sidelink link to exceed a certain QoS parameter by the tolerance while still achieving the overall predefined or negotiated QoS.

For example, when the QoS is negotiated end-to-end, the QoS_AI may be determined and signaled by a QoS manager. In accordance with all other embodiments, the QoS may be negotiated hop-by-hop, and the QoS manager may determine the QoS_AI during QoS negotiations with neighboring hops. For a hop-by-hop scenario, the overall link information may be provided to a QoS manager which, in turn, may provide hop-by-hop specific QoS_AI that may be explicitly signaled to the relay UEs.

In accordance with embodiments, tolerances for one or more of the following parameters may be provided by the QoS_AI, while it is noted that the subsequent list is not a final or exhaustive list, but that the list may include other parameters:

- a Guaranteed Flow Bit Rate, GFBR,
- a Maximum Flow Bit Rate, MFBR,
- a maximum packet loss,
- a Packet Delay Budget, PDB,
- a Packet Error Rate, PER,)
- an Aggregated Maximum Bit Rate, AMBR, per remote UE or session,
- a queueing load per remote UE or session,
- a sidelink congestion, e.g., the Channel Busy Ratio, CBR, or the Channel occupancy Ratio, CR CBR or CR.

For example, in FIG. 14 it may be assumed that the QoS manager 450 provides QoS_AI including tolerances for the PDB over the sidelink 406 by which a relay UE 400 is connected to the remote UE 402. The QoS manager 450 may determine that the link 408 allows for a PDB that is, e.g., 10% above the PDB needed for the overall QoS. This is signaled to the relay UE 400 which applies the tolerance when determining whether the PDB over the sidelink 406 is fulfilled for the desired overall QoS because a deterioration of the PDB over the sidelink 406 within the tolerances may be compensated by the higher PDB the link 408 may provide. Tolerances as described above may applicable any parameter on the link related to the QoS, like one or more of the following:

- a Guaranteed Flow Bit Rate, GFBR,
- a Maximum Flow Bit Rate, MFBR,
- a maximum packet loss,
- a Packet Delay Budget, PDB,
- a Packet Error Rate, PER,
- an Aggregated Maximum Bit Rate, AMBR, per remote UE or session,
- a queueing load or capacity or capability per remote UE or session,
- a sidelink congestion, e.g., the Channel Busy Ratio, CBR, or the Channel occupancy Ratio, CR CBR or CR.

Figure 15:
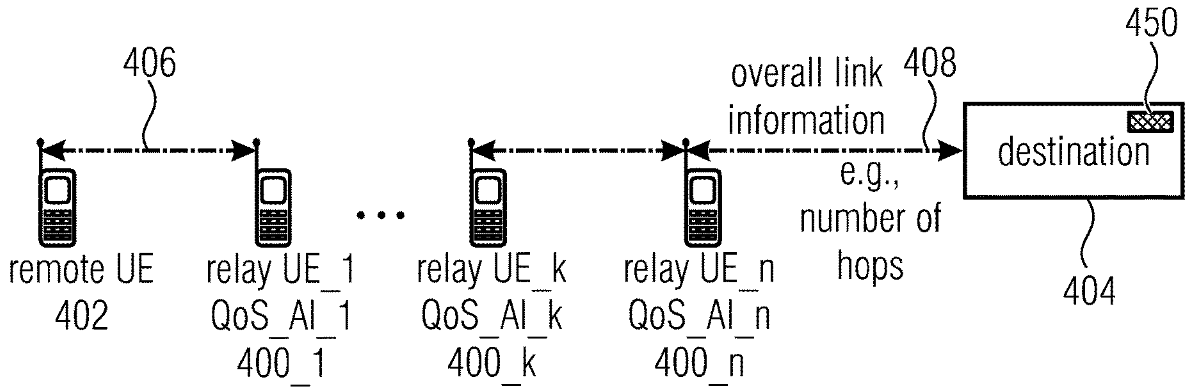
FIG. 15 illustrates an embodiment implementing a centralized calculation of QoS parameter tolerance at a destination by a QoS manager.

For example, with considering the PER, if one link is bad and can only provide 'x PER', this tolerance can be passed on to the other links The QoS profiles, as described above, may be negotiated during the session and flow establishment and at this time, when the QoS manager is implemented, also the tolerances may be determined and signaled via the QoS_AI. In accordance with embodiments, the tolerances may be calculated in a centralized manner by one QoS manager, e.g., at the destination for the entire link between the remote UE and the destination including one or more hops. FIG. 15 illustrates an embodiment implementing a centralized calculation at the destination 404 by a QoS manager 450. The remote UE 402 is connected to the destination 404 via n relay UEs 400 and the QoS manager 450 provides, via the relay specific QoS_AI_1 to QoS_AI_n, the respective tolerances for one or more of the QoS parameters that may be applied when determining at the respective relay UEs whether one or more of the QoS parameters over a sidelink connecting the relay UE to the remote UE or to another relay UE fulfill for the desired overall QoS. The QoS manager 450 may calculate the tolerances using certain link information, like a hop count, a link measurement, a UE location and the like. In accordance with other embodiments, the QoS manager 450 may be located at the remote UE, or at any one of the relay UEs, or at a network entity of the wireless communication network to which a relay UE is connected.

In accordance with other embodiments, the tolerances may be calculated in a decentralized or distributed manner, i.e., the tolerances may be calculated for some or each of the relays at a plurality of QoS managers provided along the connection between the remote UE and the destination. For example, the tolerances for a first part of a multi-hop link may be provided by a first QoS manager, while another QoS manager calculates the tolerances for another part of the link In FIG. 15, relay UE_1 may include a QoS manager to calculate the tolerances for the link 406 between the remote UE to the relay UE_1, and a second QoS manager may be implemented at one of the other relay UEs or at the destination to calculate the tolerances for the other sidelinks.

In case of UE-to-network relaying, as illustrated in FIG. 15, the QoS_AI for the overall link between the remote UE and the destination may calculated at the network and then signaled to the one or more relay UEs along the connection between the remote UE and the destination. In case of the single hop UE-to-network relay, only relay UE_1 is present, which is connected to the remote UE and to the destination. In case of a multi-hop UE-to-network relay, n relay UEs are provided between the remote UE and the destination with n being greater than or equal to 2.

Figure 16A:
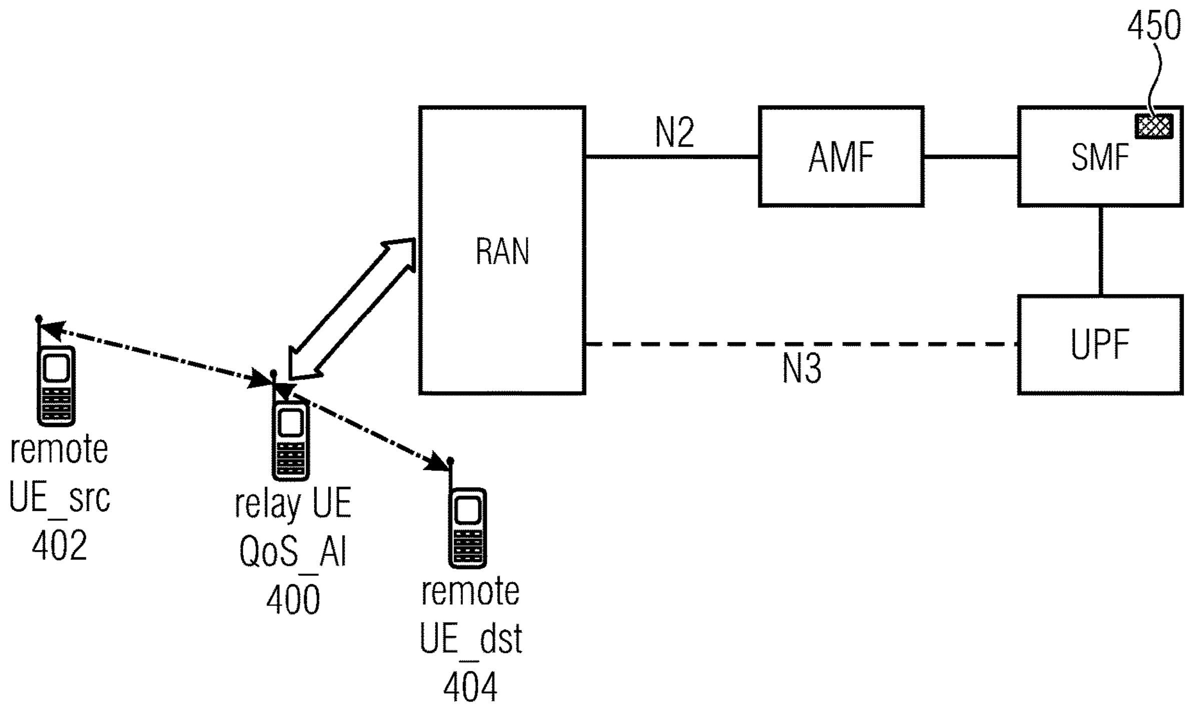
FIG. 16*a-b* illustrates a wireless communication network implementing a single-hop multi-hop-UE-to-UE relay, see FIG. 16(*a*), and a multi-hop-UE-to-UE relay, see FIG. 16(*b*).
Figure 16B:
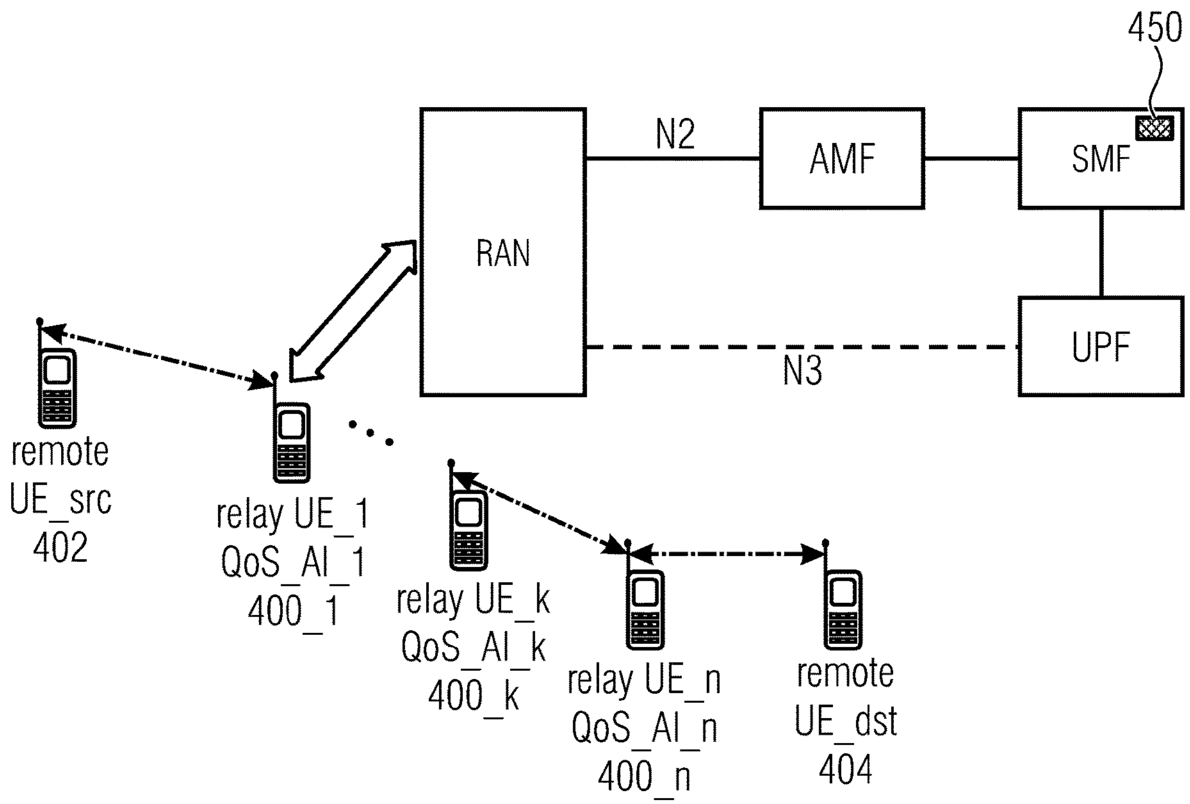

In case of a UE-to-UE relaying, the location for the centralized calculation of the tolerances depends on whether any one of the relay UEs is within the coverage of the network or not. In case none of the relay UEs is within the coverage of the network, the QoS manager may be included in the destination UE or in the remote UE. In case one of the relays along the path between the remote UE and the destination UE has access to the network, the network may include the QoS manager. In case more than one relay UEs has access to the network, one of the relay UEs may be referred to as an anchor relay UE which provides the functionality to receive the QoS_AI from the network. FIG. 16 illustrates a wireless communication network implementing a single-hop multi-hop-UE-to-UE relay, see FIG. 16(*a*), and a multi-hop-UE-to-UE relay, see FIG. 16(*b*), including relay UE_1 having access to the network in which the QoS manager is part of the SMF. Relay UE_1 receives the tolerances as QoS_AI from the network and distributes the QoS_AI among the plurality of relay UEs between the remote UE and the destination remote UE. In case of UE-to-UE relaying employing a decentralized calculation of the tolerances, respective QoS managers may be provided, for example to calculate the tolerances for every hop along the path between the remote UE and the destination remote UE.

In accordance with embodiments described thus far, a relay UE has been illustrated connected to a single remote UE. However, the relay UE may provide connectivity between a plurality of remote UEs and a destination, and in such scenarios an aggregated set of QoS parameters or tolerances that the relay UE may be provided as QoS_AI, for example, one set of parameters for all remote UEs being served. In accordance with other embodiments, remote UE specific QoS parameters or tolerances may be provided in the QoS_AI. For example, when the relay UE serves three remote UEs, the QoS_AI may indicate three different sets of QoS parameters or tolerances. The signaling of the QoS_AI may use RRC signaling as a part of the RRC_Reconfiguration message or the RRCSetup message. For example, the aggregated tolerances may be associated with non-GBR traffic, and the UE specific tolerances may be associated with GBR traffic, and the relay UE may trigger a load balancing reselection by signaling to any remote UE subscribing to non-GBR traffic, when one or more of the QoS parameters are not fulfilled. The load balancing reselection may be signaled as one or more of:

- an RRC message,
- a MAC CE,
- a physical layer signal, e.g. on physical layer feedback or control channel e.g. PSFCH or PSCCH,
- a higher layer signaling, e.g., the application layer.

In accordance with embodiments, after sending a first QoS_AI, e.g., an initial QoS_AI, the QoS manager may provide or send a second QoS_AI indicating an update for one or more of the tolerances and/or tolerances for one or more additional QoS parameters. For example, the QoS manager may provide the second QoS_AI responsive to receiving from one or more of the relays a measurement result of the one or more QoS parameters associated with the predefined or negotiated QoS on the sidelink, e.g., by receiving a QoS Measurement Report, QoS_MR.

Third Aspect

Embodiments of the third aspect of the present invention are now described. Embodiments of the third aspect of the present invention implement a reflective QoS concept at the relay UE so as to allow, e.g., a QoS Management at the relay UE using the Relay QoS Packet Processing Information, RPPQI.

As stated above, conventionally, the RAN may assist a UE on the uplink by providing the UE with a QoS flow to data radio bearer mapping either explicitly or by providing this mapping using reflective QoS. In accordance with embodiments of the third aspect of the present invention, this is also employed in a relay scenario.

Figure 17:
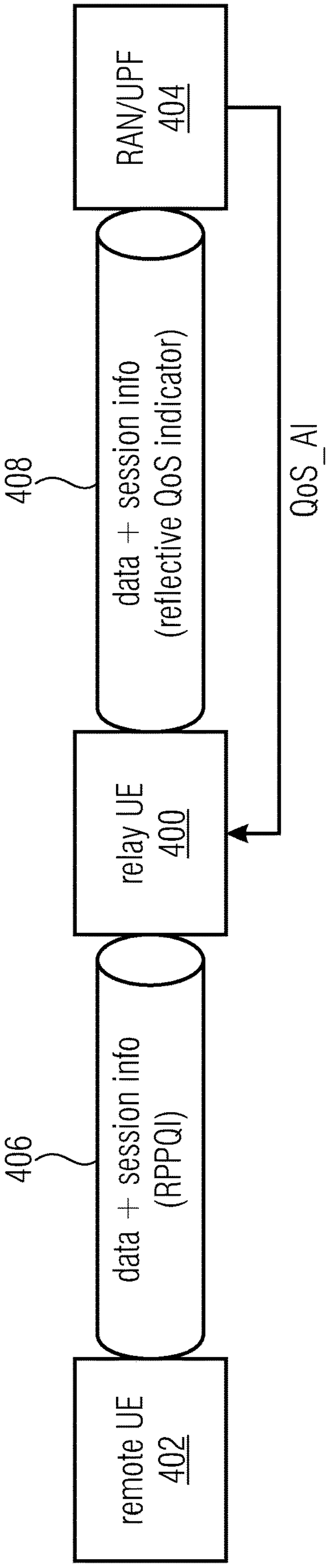
FIG. 17 illustrates an embodiment of the second aspect of the present invention employing Relay QoS Packet Processing Information, RPPQI, by a relay UE.

FIG. 17 illustrates an embodiment employing a relay UE RPPQI. The relay UE 400, that may be provided by the network 404 with QoS_AI regarding tolerances on the sidelink link 406 between the remote UE 400 and the relay UE 400, further receives from the RAN 404 data and session information including the reflective QoS indicator. The reflective QoS indicator may be used in case the relay UE 400 has tight resource constraints so that greater control of the QoS and remapping of the QoS flow to data radio bearer towards the remote UE 402 as needed. RPPQI is invoked on a packet basis, and FIG. 17 illustrates the case when the RQI is sent by the core network. Instead of just transferring the RQI from the core network, the relay UE 400 re-evaluates the appropriate QoS flow to data bearer mapping for a certain packet based on the RQI and the tolerances in the QoS_AI provided to the relay UE. Using the QoS parameters or tolerances given in the QoS_AI and the relay UEs assessment of the available resources from the remote UE, the relay UE may decide that a specific, different QoS flow to bearer mapping is to be applied and sends the RPPQI to the remote UE. The RPPQI may include an indication of how the data is to be treated in a transmission from the remote UE towards the relay UE, information about the scheduling requirements in both directions, and information about the DRB mapping requirements in both directions.

Based on the RPPQI, the relay UE may also perform a pre-scheduling of the data in the other direction, for example, when the network sends data to the remote UE via the UE-to-network relay, the response from the relay UE may be pre-scheduled based on the RPPQI. This may be referred to as a calendar scheduling that includes providing a dedicated set of resources and/or semi-static or semi-persistent set of resources.

Fourth Aspect

Embodiments of the fourth aspect of the present invention are now described. Embodiment of the fourth aspect of the present invention implement an early BSR at the relay UE. In accordance with further embodiments, the above-described conventional early BSR may be used in relay scenarios.

Conventionally, the early BSR is triggered by the relay node before the data from the source has arrived at the relay. In accordance with embodiments of the present invention, the early BSR request may be triggered based on an outcome of the QoS measurements performed at the relay UE, and the BSR may serve as a mechanism to support the fulfillment or meeting of QoS requirements.

Figure 18:
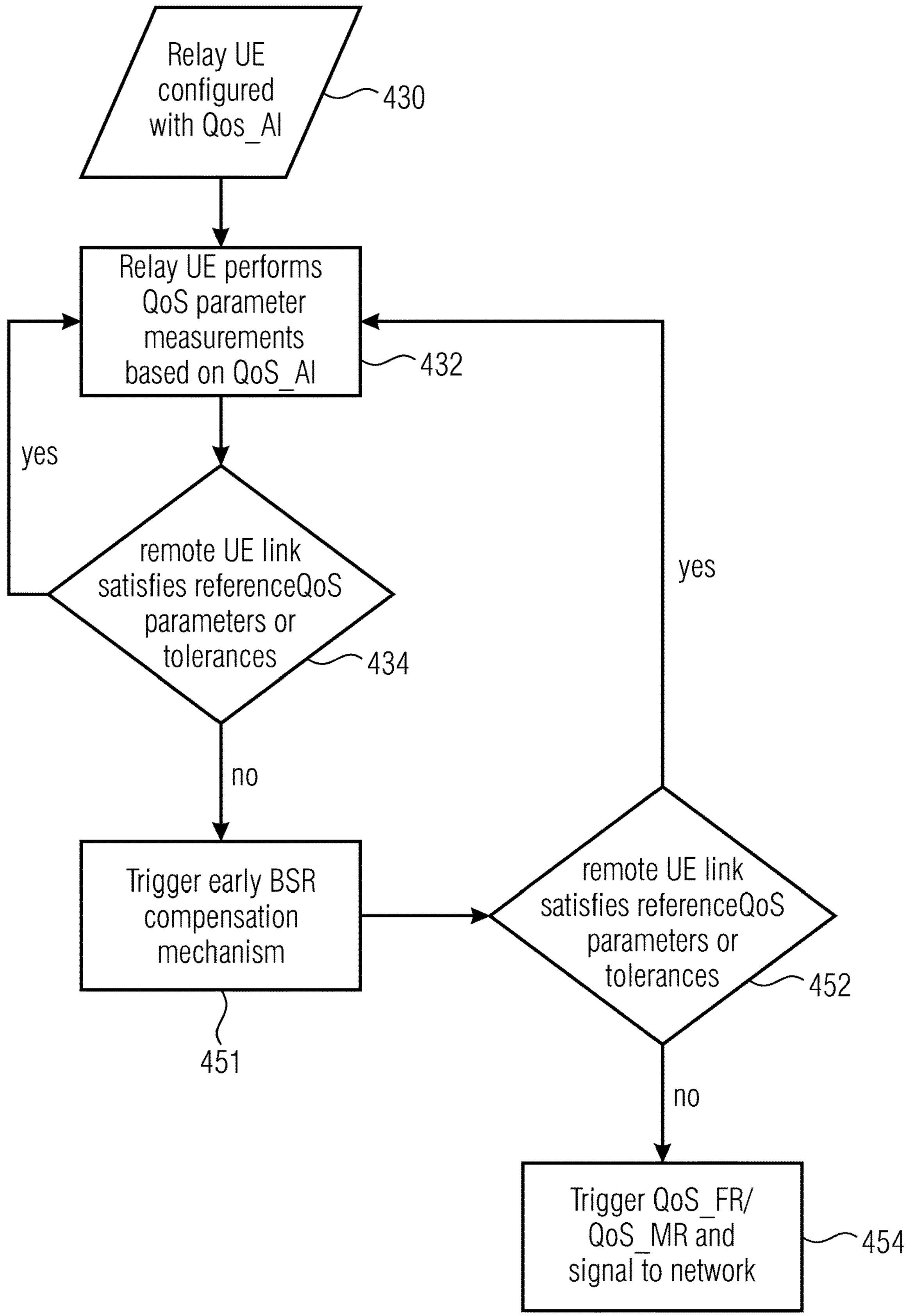
FIG. 18 illustrates a flow diagram of an early BSR compensation mechanism in accordance with embodiments of the fourth aspect of the present invention.

FIG. 18 illustrates a flow diagram of an early BSR compensation mechanism in accordance with embodiments of the present invention. In a similar way as described with reference to FIG. 9, the relay UE is configured with the QoS_AI, performs respective measurements and evaluates at 434 whether the reference QoS parameters or tolerances are satisfied or not. In case they are not satisfied, the relay UE, as is indicated at 451, may trigger the early BSR compensation mechanism and determine, again, at 452 whether, responsive to the early BSR compensation mechanism, the reference QoS parameters or tolerances are satisfied. If yes, the process returns to 432, otherwise, the QoS_FR or the QoS_MR is signaled, as is indicated at 454 in a way as described above with reference to the embodiments of the first aspect of the present invention.

Thus, the trigger for the early BSR may be based on the measurements made by the relay UE 400 so that, for example, when the relay UE calculates that the QoS parameters or tolerances are not being met, the relay UE 400 may trigger the early BSR to try to compensate, for example, a queuing load, a delay, or the like. For example, when the relay UE determines that the calculated queuing load exceeds the values as indicated in the QoS_AI, the relay UE may use the early BSR mechanism to reduce the queuing load. For example, when the relaying entity has a queuing capacity or tolerance of 8 packets for a particular remote UE, if it is assumed that the relaying entity receives a BSR from the remote UE claiming to send 10 packets, the early BSR may help the scheduling entity to provide for physical resources to accommodate the additional 2 packets from the remote UE i.e., a request for additional resources.

In accordance with embodiments, the early BSR may be triggered responsive to measurements or calculations indicating that the QoS parameters are not met. In accordance with other embodiments, the early BSR may also be triggered in case

- a queuing capability or capacity of the UE for remote UE data to be received or to be sent approaches or has reached a threshold, or
- the QoS parameters are predicted to be not in line with the reference parameters or within the tolerances, or
- a BSR report is received from one or more remote UEs, wherein the based on the BSR report received from the remote UE, the relay entity determines that it cannot support this size of data requested—thus it triggers the early BSR to request for more resources from the scheduling entity, or
- a change in the QoS is requested by the remote UE, or
- a certain number of consecutive NACKs as HARQ feedback.

The QoS between the remote UE and the destination may be predicted by measuring on the sidelink one or more QoS parameters associated with the predefined or negotiated QoS.

As explained above with reference to FIG. 18, in case the relay UE still calculates or predicts that the QoS parameters do not satisfy the referenced parameters after the early SR/BSR, the relay may trigger the QoS_FR or QoS_MR. In accordance with other embodiments, in a multi-hop system delays may accumulate to a number of hops and to meet strict latency requirements in such a system, a remote UE may also negotiate with the one or more relay UEs to use an early SR/BSR trigger for the duration of the PDU session as opposed to using a dynamic compensation mechanism. For example, if the relaying entity determines that it cannot satisfy the QoS requirements at the start, it will employ the early BSR mechanism to obtain resources. As opposed to if the relaying entity determines that the QoS requirements cannot be satisfied at a particular time, it can employ the early BSR mechanism when necessary to obtain additional resources.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

Multi-Hop Relays

In the embodiments described above, the end-to-end communication between the transmitting entity and the receiving entity is via a single relay that forwards the feedback from the receiving entity and/or that differentiates the traffic as described above. However, the present invention is not limited to such embodiments, rather, in accordance with further embodiments, the end-to-end communication between the transmitting entity and the receiving entity may be via a plurality of relays, also referred to as a set of relay UEs or as a chain of relay UEs.

Figure 19:
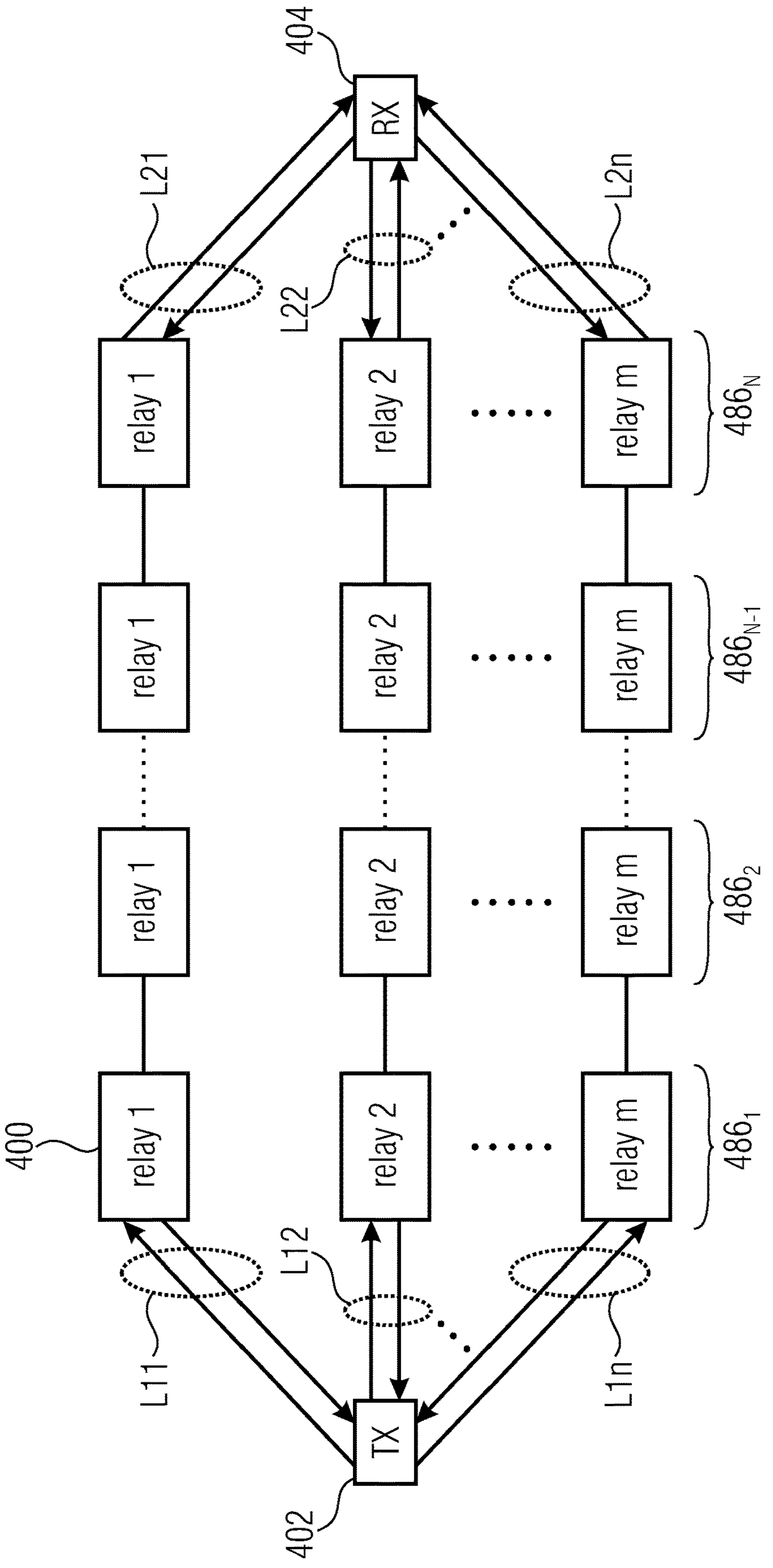
FIG. 19 illustrates an embodiment of the present invention using N relays for a communication between a transmitting entity and a receiving entity.
Figure 20:
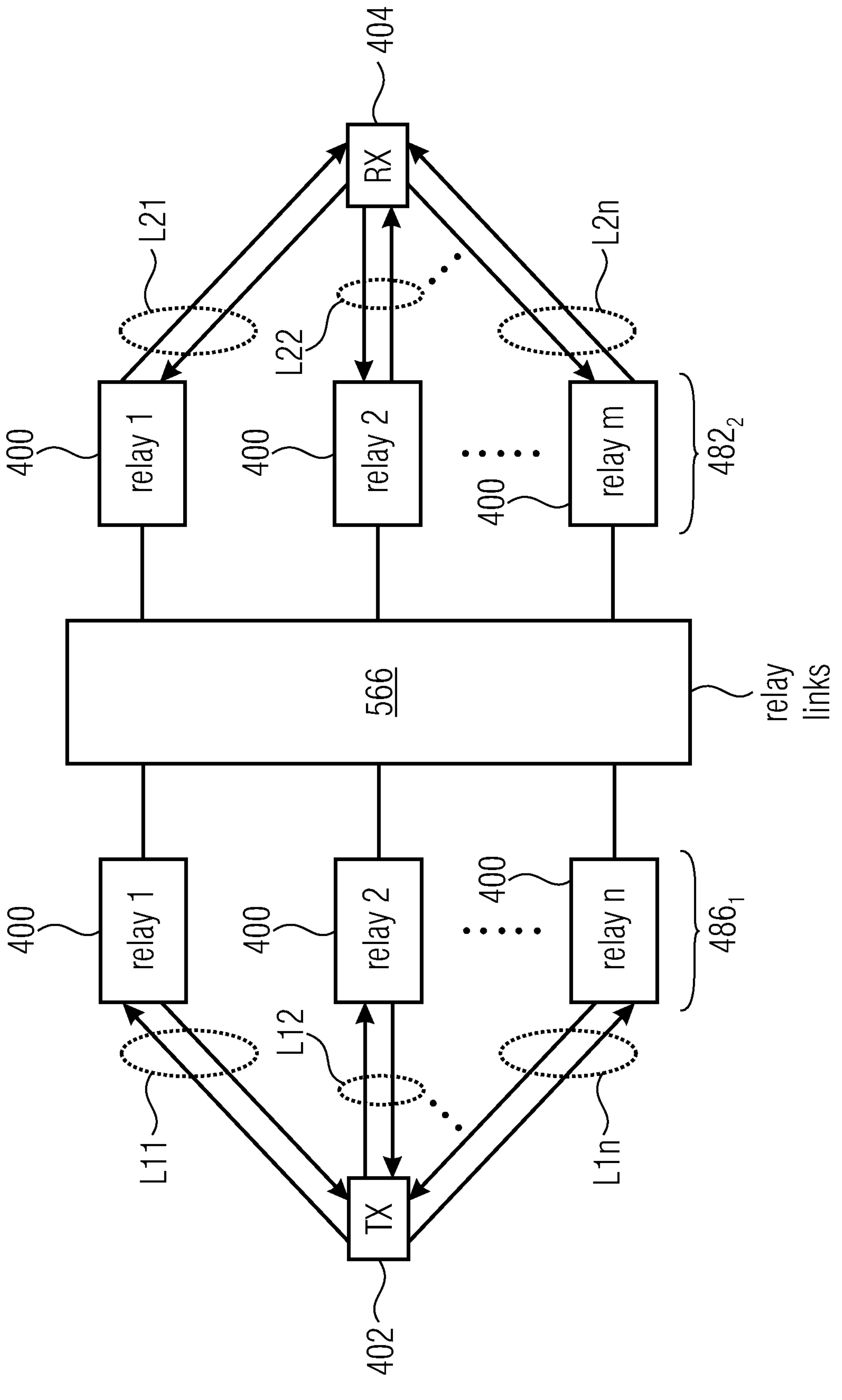
FIG. 20 illustrates an embodiment of the present invention employing N=2 relay layers for the end-to-end communication between a transmitting entity and a receiving entity.

FIG. 19 illustrates an embodiment in accordance with which the communication between the transmitting entity 402 and the receiving entity 404 is using N relays 400, N≥2. Each relay layer includes a plurality of relay devices 1 to m, like relay UEs. The respective relay layers $\mathbf{486}_1$ to $\mathbf{486}_N$ may include the same number of relay UEs or some or all of the relay layers $\mathbf{486}_1$ to $\mathbf{486}_N$ may include different numbers of relay UEs. The receiving entity 404 may connect to the relays of the first relay layer $\mathbf{486}_1$, and the transmitting entity 402 and may connect to the relays of the relay layer $\mathbf{486}_N$. FIG. 20 illustrates an embodiment employing N=2 relay layers for the end-to-end communication between the transmitting entity 402 and the receiving entity 404. The first relay layer $\mathbf{486}_1$ may include n UE relays 400. The transmitting entity 402 may be connectable to a second relay layer $\mathbf{486}_2$, and the second relay layer $\mathbf{486}_2$ may include m UE relays 400. In accordance with embodiments, the respective relay layers $\mathbf{486}_1$, $\mathbf{486}_2$ may have the same number of relays, n=m. In accordance with other embodiments, the number of relays in the respective relay layers $\mathbf{486}_1$, $\mathbf{486}_2$ may be different, i.e., n/m. The respective relays in the different relay layers $\mathbf{486}_1$, $\mathbf{486}_2$ may connect with each other, as is indicated, schematically, at 566. Some or all of the relays in the first relay layer $\mathbf{486}_1$ may connect with some or all of the relays in the second relay layer $\mathbf{486}_2$. The respective relays in the layers forward the feedback from the receiving entity 404 and/or that differentiate the traffic as described above in detail with reference to the first and second aspects of the present invention.

Embodiments of the present invention have been described in detail above, and the respective embodiments and aspects may be implemented individually or two or more of the embodiments or aspects may be implemented in combination. In other words, any of the above described embodiments of the first aspect concerning the provision of the overall feedback from the receiving entity to the transmitting entity via the one or more relays may be combined with any of the above described embodiments of the second aspect concerning the differentiation of the traffic at the one or more relays.

General

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a network entity comprises one or more of the following: a macro cell base station, or a small cell base station, or a central unit of a base station, an integrated access and backhaul, IAB, node, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 21:
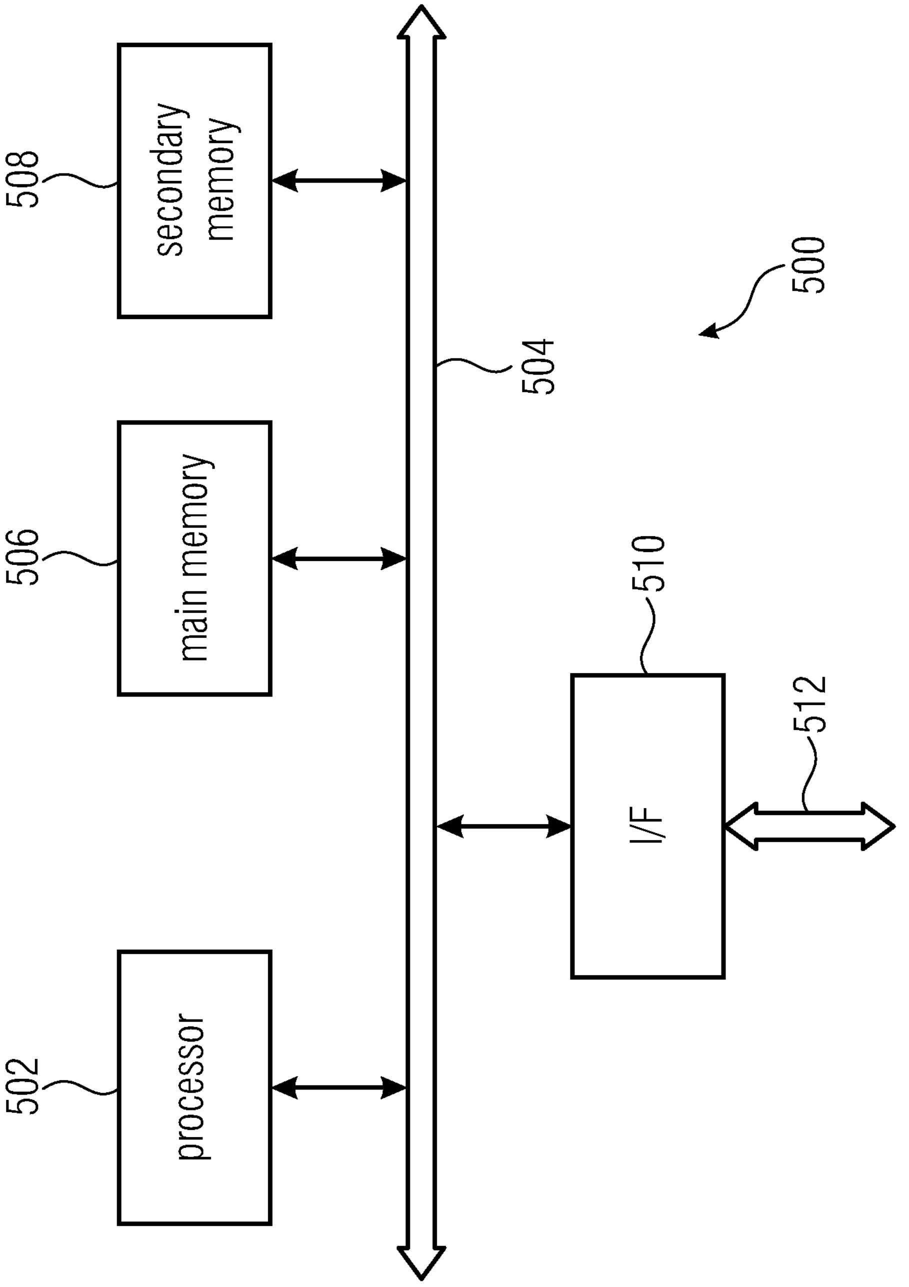
FIG. 21 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 21 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory, RAM, and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device comprising:

a processor circuit and a memory circuit, wherein the memory circuit is arranged to store instructions for the processor circuit, wherein the processor circuit is arranged to support connectivity between at least one remote UEs and a destination of a wireless communication network, wherein a connection between the at least one remote UEs and the destination comprises at least one sidelinks, wherein each of the at least one sidelinks is associated with a predefined or negotiated Quality-of-Service, Qos, wherein the device is connected via the at least one sidelinks to the at least one remote UEs, the destination or at least one relay UEs, wherein the processor circuit is arranged to determine a status of the sidelink with regard to the predefined or negotiated Qos, wherein the processor circuit is arranged to send the status of the sidelink towards a network entity, wherein the processor circuit is arranged to use QoS assistance information, QoS AI, wherein the QoS AI comprises tolerances for the at least one Qos parameters on the sidelink.

2. The device of claim 1, wherein the device is connected over a first sidelink to the at least one remote UEs and/or to at least one further relay UEs and over a second sidelink to the destination if the destination a further UE, or wherein the device is connected over a first sidelink to at least one of the at least remote UEs and/or to at least one further relay UEs and over a second sidelink to at least one further relay UEs, or wherein the device is connected over a sidelink to at least one of the at least remote UEs and/or to at least one further relay UEs and over a network link to the destination.

3. The device of claim 1, wherein the sidelink comprises a PC5 connection or a Bluetooth or WiFi connection.

4. The device of claim 1, wherein the processor circuit is arranged to send the status of the sidelink to the network entity if the device is connected to the network entity, wherein the processor circuit is arranged to send the status to the network entity via the at least one further relay UEs connected to the network entity if the device is not connected to the network entity, wherein the device is connected to the at least one further relay UEs directly or via at least one other relay UEs.

5. The device of claim 1, wherein the device is configured with a Quality-of-Service, Qos, profile for the sidelink, wherein the Qos provide provides the predefined or negotiated Qos between the at least remote UEs and the destination via the device, wherein the QoS profile enables or activates the processor circuit to determine and signal the status of the sidelink.

6. The device of claim 1, wherein the processor circuit measures at least one Qos parameters associated with the predefined or negotiated QoS of the sidelink so as to determine the status of the sidelink.

7. The device of claim 1, wherein the processor circuit signals the status using Radio Resource Control, RRC, signaling or using a Media Access Control, MAC, Control Element, CE.

8. The device of claim 1, wherein the status indicates that the sidelink no longer fulfils or fulfills again the predefined or negotiated Qos on the sidelink and/or the predefined or negotiated Qos between the at least remote UEs and the destination, or wherein the status indicates a measurement result of the at least one QoS parameters associated with the predefined or negotiated QoS on the sidelink, or wherein the status indicates that the sidelink is capable to support a higher Qos than the predefined or negotiated QoS.

9. The device of claim 8, wherein the QoS_FR indicates which of the sidelinks connecting the at least one remote UEs to the device do not fulfil or satisfy the predefined or negotiated Qos if the device is acting as a relaying entity for the at least one remote UEs.

10. The device of claim 8, wherein the processor circuit is arranged to predict a Qos failure using at least one predefined parameters on the sidelink, wherein the processor circuit is arranged to send an early QoS_FR based on a prediction of a QoS failure, wherein the at least one predefined parameters comprises:

a Reference Signal Received Power, RSRP, measured over a predefined time window;

Channel State Information, CSI, acquired over the predefined time window;

beam measurements and/or beam failures;

a Hybrid Acknowledge Request, HARQ, feedback over the predefined time window;

a limitation of the transmit power at the device;

a limitation of the battery power at the device;

a limitation of the computational power at the device;

a congestion of the link to the at least remote UEs indicated by the Channel Busy Ratio, CBR, or the Channel occupancy Ratio, CR; and at least one of the Bit Error Rate, BER, the Packet Error Rate, PER, packet loss or packet delay over the predefined time window.

11. The device of claim 8,
wherein the processor circuit is arranged to attempt a transmission on the sidelink using other resources before sending the QoS_FR for the sidelink,
wherein the processor circuit is arranged not to send the QoS_FR if the transmission using the other resources meets the predefined or negotiated QoS.

12. The device of claim 8, wherein the processor circuit is arranged to send the QoS_MR periodically, and/or in response to a request, and/or in response to a failure, and/or in response to at least one events.

13. The device of claim 12, wherein the at least one events comprises:
the QoS_MR changes with regard to at least one measurement items significantly when compared to a previous QoS_MR;
at least one of the Qos parameters on the sidelink reach a configured or preconfigured threshold;
at least one of radio link failure, beam recovery procedure or beam failure, synchronization failure or high interference condition;
at least one of the Qos parameters on the sidelink differ from configured QoS parameters by more than a configured or preconfigured threshold; and
a configured or preconfigured counter indicating a number of HARQ failures or retransmissions on the sidelink is reached.

14. The device of claim 8, wherein the processor circuit is arranged to send the QoS_UP based on at least one of improvements in the measured Qos parameters allowing to satisfy a QoS higher than the predefined or negotiated Qos, a previously send QoS_FR and improvements in the measured QoS parameters allowing the predefined or negotiated QoS to be satisfied again, the expiry of a configured or preconfigured time window after sending a QoS_FR and a query.

15. The device of claim 1, wherein the processor circuit is arranged to trigger an early Buffer Status Report, BSR, for a duration of a Packet Data Unit, PDU, session with the at least one remote UE.

16. The device of claim 1,
wherein the device comprises the QoS manager, or
wherein the device is connected to the QoS manager, wherein the Qos manager is located at the at least remote UEs or at the at least one further relay UEs or at the destination or at a network entity.

17. The device of claim 1, wherein the tolerances are determined by the Qos manager based on the number of hops between the at least remote UEs and the destination and/or using measurements of Qos parameters associated with the predefined or negotiated Qos on at least one or all of the links between the at least remote UEs and the destination.

18. The device of claim 1,
wherein the device is to arranged as an anchor relay UE if the Qos manager is located in a network entity of the wireless communication network and the connection between the at least one remote UEs and the destination comprises the UE and at least one further UEs act as a relaying entity,
wherein the anchor relay UE is the only UE acting as a relay that communicates with the QoS Manager.

19. The device of claim 18, wherein the processor circuit is arranged to receive from the at least remote UEs or from the destination or from the network entity a signaling informing the device to act as the anchor relay UE.

20. The device of claim 1, wherein the tolerances comprise:
aggregated tolerances for the at least one sidelinks between a portion of a plurality of the at least one remote UEs and the device; and
a remote UE tolerances for the sidelink between a first remote UE of the at least one remote UEs and the device.

21. The device of claim 20,
wherein the aggregated tolerances are associated with non-GBR traffic,
Wherein the UE specific tolerances are associated with GBR traffic,
the processor circuit is arranged to trigger a load balancing reselection by signaling to any of the at least one remote UEs or any further relay UE subscribing to or handling non-GBR traffic if at least one of the Qos parameters are not fulfilled.

22. The device of claim 20, wherein the load balancing reselection is signaled as at least one of an RRC message, an RLC message, a MAC CE, a physical layer signal, and a higher layer signaling.

23. The device of claim 1, wherein the destination comprises a second device another UE of the wireless communication network or an entity of the core network or an entity of the access network.

24. The device of claim 1, wherein the user device comprises:
a mobile terminal;
a stationary terminal;
a cellular IoT-UE;
a vehicular UE;
a leader, GL, UE;
an IoT or narrowband IoT, NB-IoT, device;
a wearable device;
a ground based vehicle;
an aerial vehicle;
a drone;
a moving base station;
a road side unit, RSU;
a building; and
any other item or device provided with network connectivity enabling the item/device to communicate using the wireless communication network.

* * * * *